(12) United States Patent
Nagai

(10) Patent No.: US 9,960,814 B2
(45) Date of Patent: May 1, 2018

(54) CONTACTLESS INFORMATION COMMUNICATION TERMINAL UNIT, CARD-TYPE DEVICE, PORTABLE TELEPHONE, AND WEARABLE DEVICE

(71) Applicant: E-GARDE CO., LTD., Tokyo (JP)

(72) Inventor: Sadao Nagai, Saitama (JP)

(73) Assignee: E-GARDE CO., LTD., Tokyo (JP)

( * ) Notice: Subject to any disclaimer, the term of this patent is extended or adjusted under 35 U.S.C. 154(b) by 0 days. days.

(21) Appl. No.: 15/507,194

(22) PCT Filed: Aug. 31, 2015

(86) PCT No.: PCT/JP2015/074767
§ 371 (c)(1),
(2) Date: Feb. 27, 2017

(87) PCT Pub. No.: WO2016/035771
PCT Pub. Date: Mar. 10, 2016

(65) Prior Publication Data
US 2017/0195009 A1 Jul. 6, 2017

(30) Foreign Application Priority Data

Sep. 1, 2014 (JP) ................................ 2014-177529

(51) Int. Cl.
*H04B 5/00* (2006.01)

(52) U.S. Cl.
CPC ......... *H04B 5/0031* (2013.01); *H04B 5/0081* (2013.01)

(58) Field of Classification Search
CPC ............................ H04B 5/0031; H04B 5/0081
(Continued)

(56) References Cited

U.S. PATENT DOCUMENTS

2007/0198981 A1* 8/2007 Jacobs .................. G06F 1/3203
718/102
2010/0097280 A1 4/2010 Zirbes et al.
(Continued)

FOREIGN PATENT DOCUMENTS

JP 2012-016062 1/2012
JP 2012-016062 A 1/2012
(Continued)

OTHER PUBLICATIONS

International Search Report dated Nov. 24, 2015 in PCT/JP2015/074767 with English translation, 4 pages.
(Continued)

*Primary Examiner* — Raj Chakraborty
(74) *Attorney, Agent, or Firm* — Muncy, Geissler, Olds & Lowe, P.C.

(57) ABSTRACT

Provided is a highly convenient and downsizable terminal device, which realizes, even when more than two contactless information communication units, each utilizing a different frequency band, are mounted on a single IC tag, good communication in each of the different frequency bands. The terminal device has two contactless information communication parts (circuit units, such as an inlay, inlet, chip or the like), which utilizes different frequency bands (for example, the HF band and the UHF band, which is higher than the HF band) performs transmission and reception of signals with two antennae being electric-field-coupled to each other.

16 Claims, 21 Drawing Sheets

(58) Field of Classification Search
USPC .............................................. 455/41.1, 41.2
See application file for complete search history.

(56) References Cited

U.S. PATENT DOCUMENTS

| | | |
|---|---|---|
| 2010/0283694 A1 | 11/2010 | Kato |
| 2010/0302013 A1 | 12/2010 | Kato et al. |
| 2011/0084888 A1* | 4/2011 | Nishioka .................. H01Q 5/35 343/728 |
| 2011/0090060 A1* | 4/2011 | Tavshikar ............ G06K 7/0004 340/10.3 |
| 2012/0197743 A1* | 8/2012 | Grigg ..................... G06Q 20/20 705/16 |
| 2014/0062787 A1* | 3/2014 | Nazarov .......... G06K 19/07372 342/378 |
| 2014/0071818 A1* | 3/2014 | Wang .................... H04W 28/06 370/230 |
| 2014/0206347 A1* | 7/2014 | Shah ...................... G08B 21/24 455/426.1 |

FOREIGN PATENT DOCUMENTS

| | | |
|---|---|---|
| JP | 2012-506079 A | 3/2012 |
| JP | 2012-108843 | 6/2012 |
| JP | 2012-108843 A | 6/2012 |
| WO | 2009/110382 A1 | 9/2009 |
| WO | 2010/045992 A1 | 4/2010 |

OTHER PUBLICATIONS

Written Opinion from corresponding application PCT/JP2015/074767.
International Preliminary Examination Report from corresponding application PCT/JP2015/074767.
Extended European Search Report for No. 15837284.7 dated Aug. 16, 2017.

* cited by examiner

FIG. 1
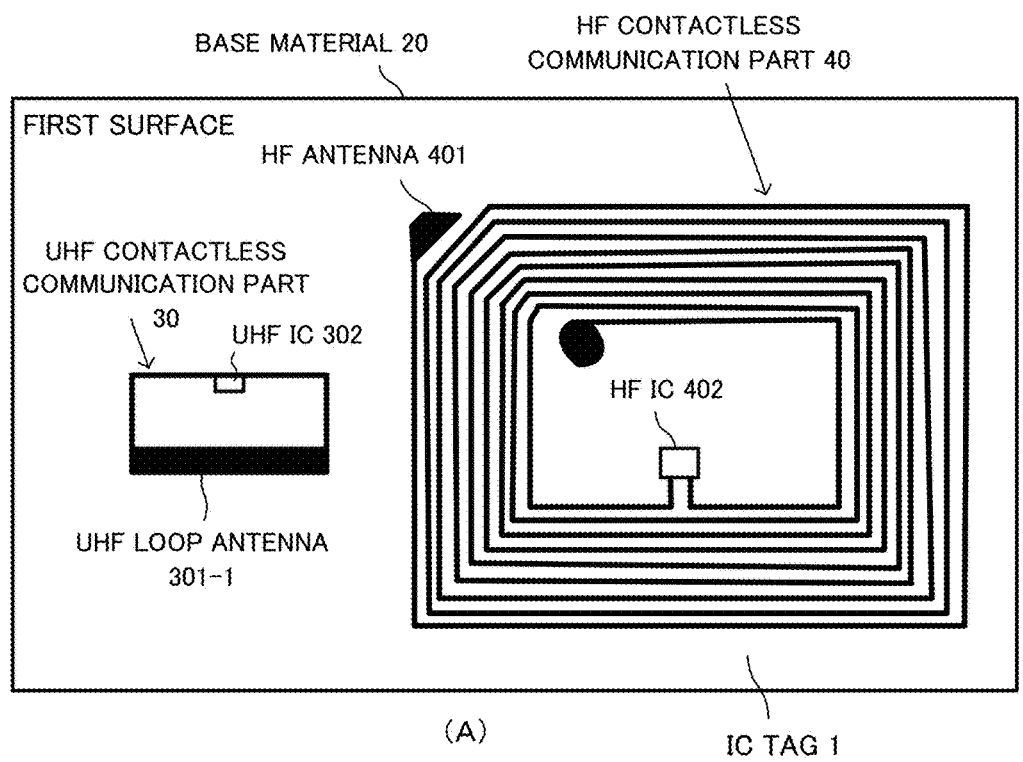
(A)
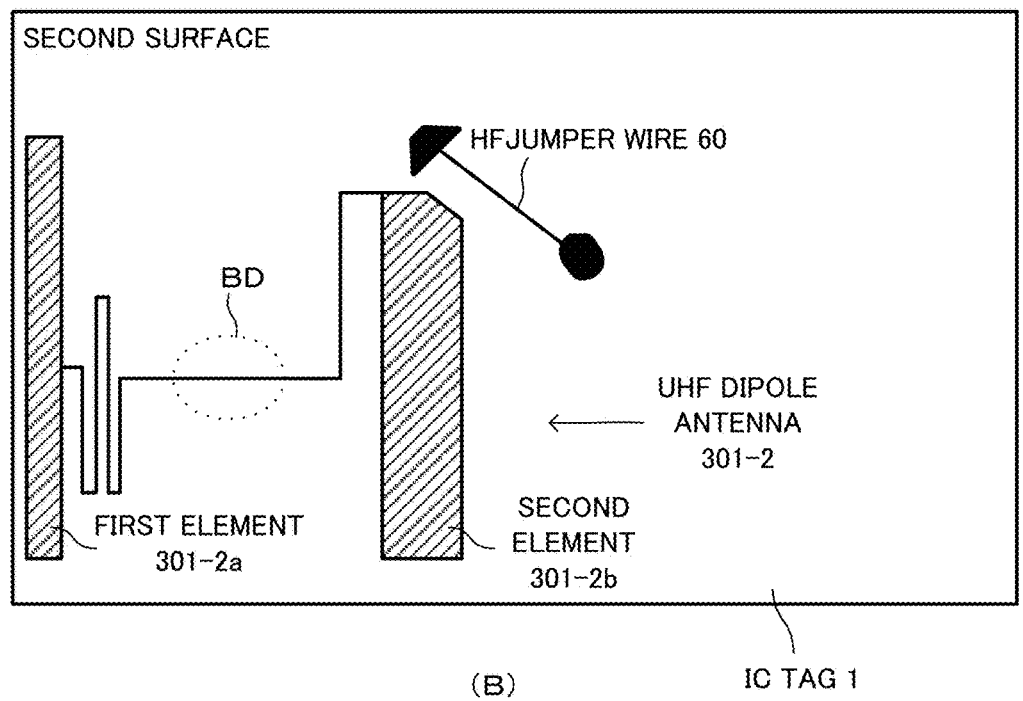
(B)

FIG. 12
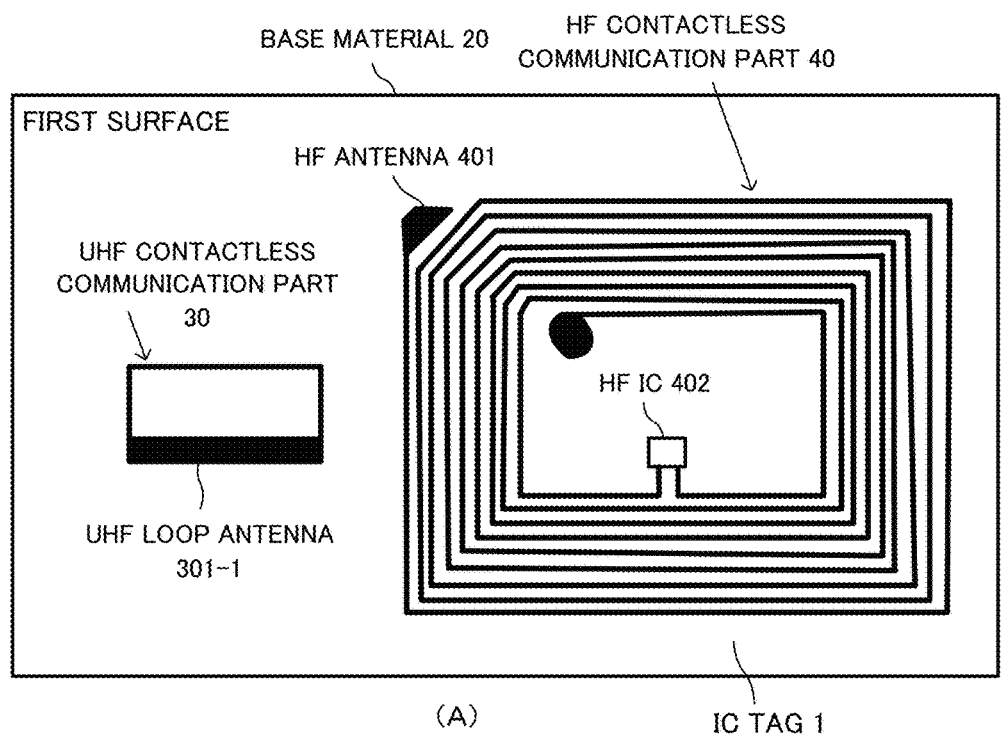
(A)
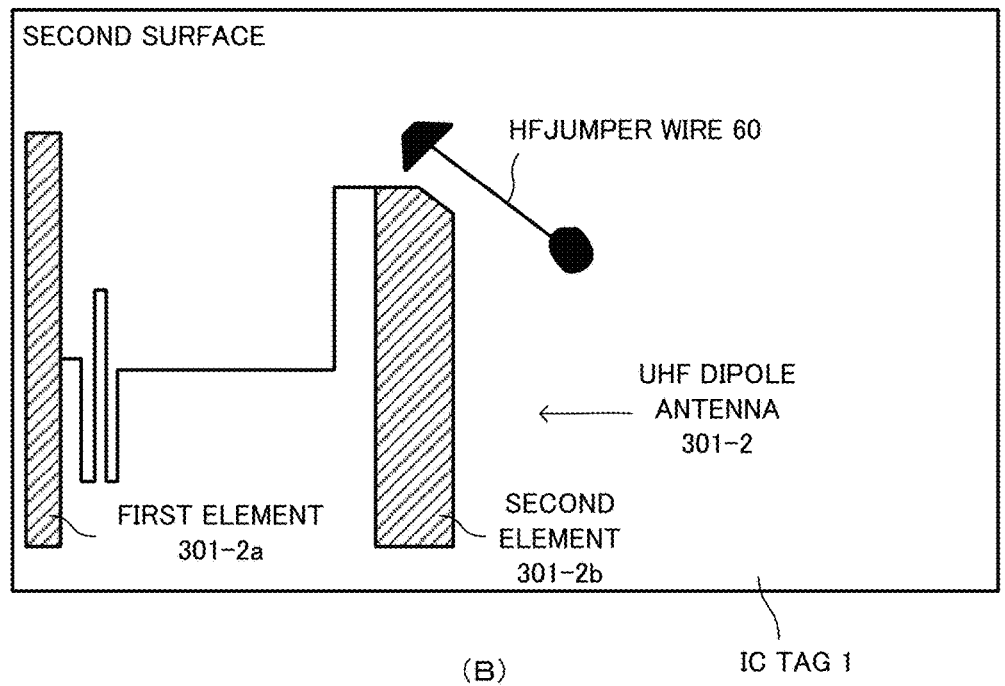
(B)

FIG. 13
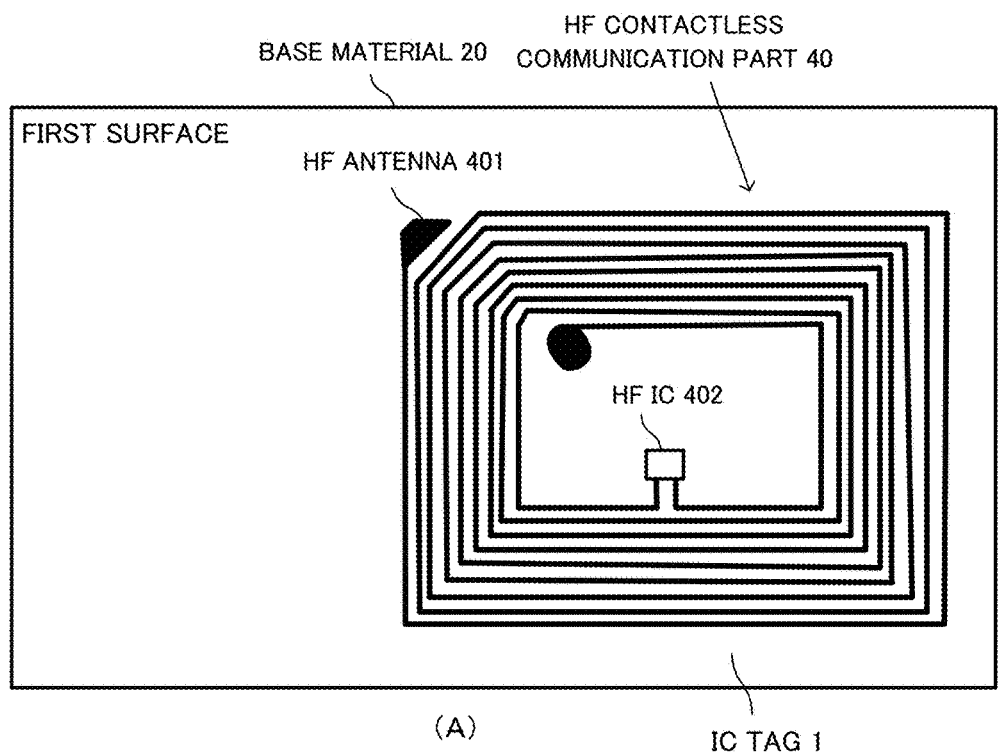
(A)
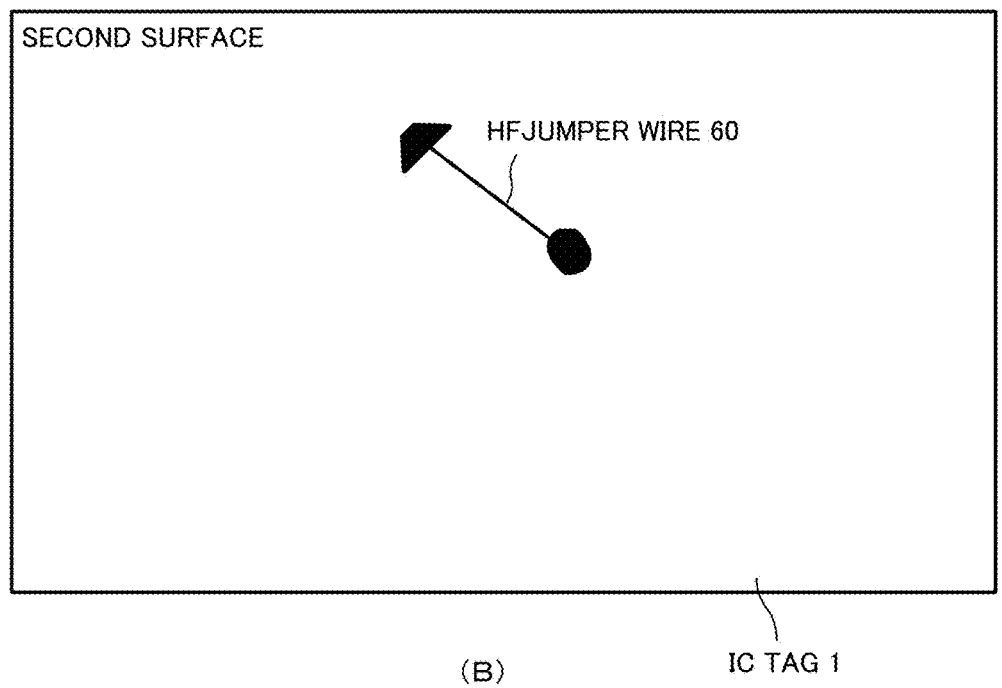
(B)

FIG. 17
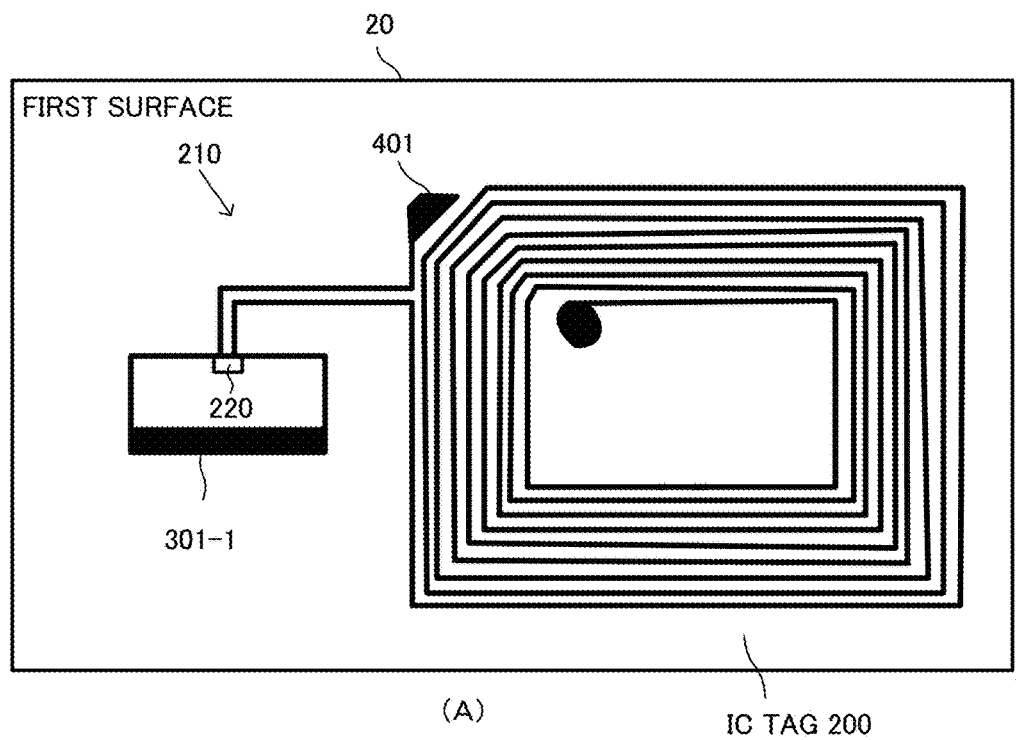
(A)
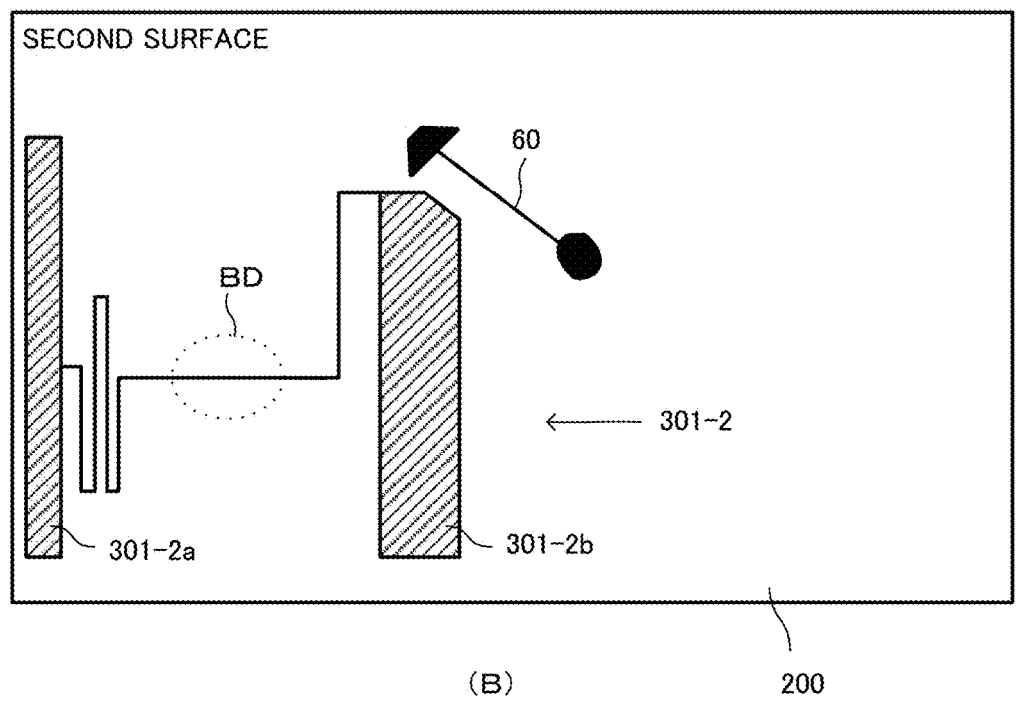
(B)

FIG. 18
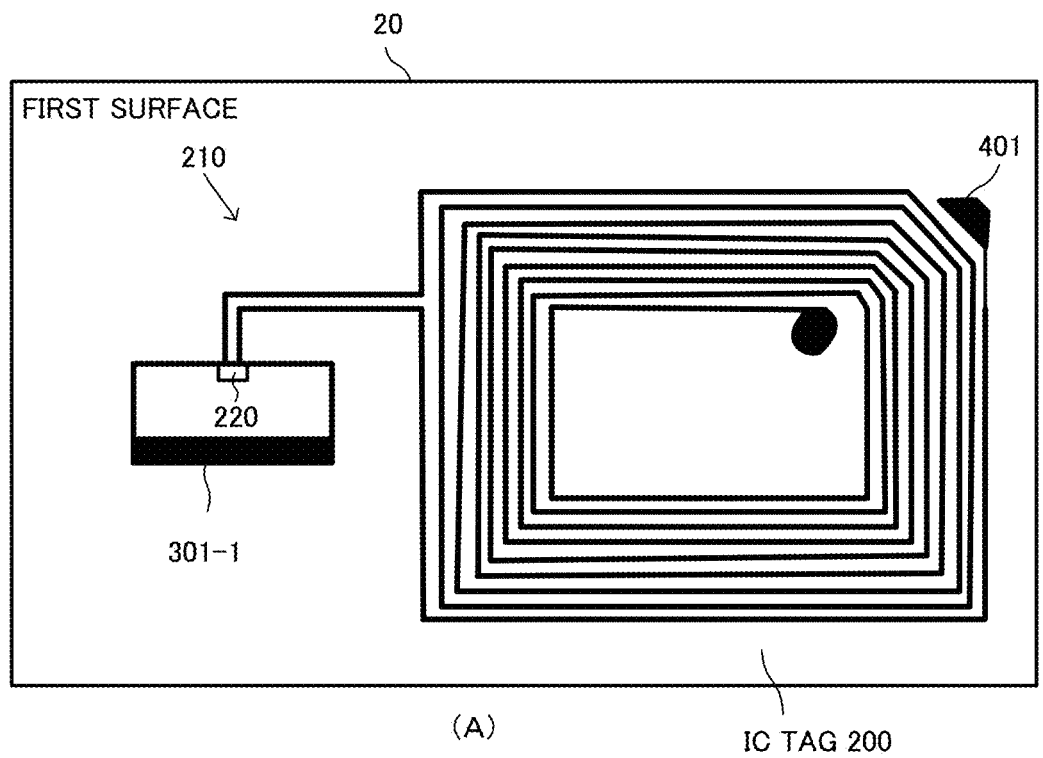
(A)
IC TAG 200
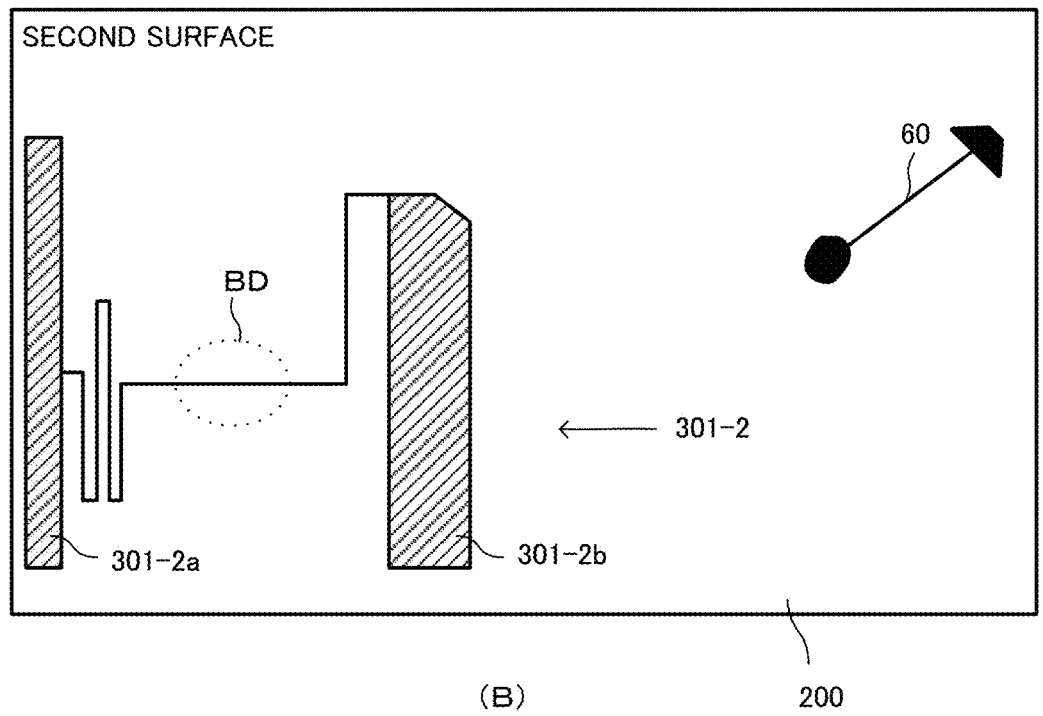
(B)

CONTACTLESS INFORMATION COMMUNICATION TERMINAL UNIT, CARD-TYPE DEVICE, PORTABLE TELEPHONE, AND WEARABLE DEVICE

FIELD OF THE INVENTION

The present invention relates to a contactless information communication terminal device, which is used for an IC tag or the like, and to various devices having such contactless information communication terminal device mounted thereon.

BACKGROUND ART

Traditionally, radio frequency identifier (RFID) systems with an IC tag for RFID and a reader/writer (hereinafter simply referred to as a "reader device") include:

(1) a communication system that makes use of signals in the ultra-high frequency (UHF) band (for example, signals in the 920 MHz band or the 2.45 GHz band) (hereinafter referred to as the "UHF system") (see, for example, Patent Document 1); and (2) a communication system that makes use of signals in the high frequency (HF) band (for example, signals in the 13.5 MHz band) (hereinafter referred to as the "HF system") (see, for example, Patent Document 2).

The UHF system performs communication by making use of an IC tag with an antenna, such as a dipole antenna, a slot antenna, or the like, and by utilizing electromagnetic waves (electrical waves). As compared to the HF system, the UHF system can send a large amount of information by utilizing the characteristic to the effect that the communication distance is large (in the order of a few meters), and it is often used in systems where data transmission and reception with respect to multiple IC tags are performed all at once.

In particular, since the UHF system has such characteristic, it is often used in systems where simultaneous communication with a plurality of terminal units is performed more than once, such as physical distribution management systems, rather than in systems where one-on-one individual communication is necessary, and it provides convenience in such communication systems.

On the other hand, the HF system performs communication by making use of an IC tag with a loop-coil type antenna and by utilizing electromagnetic waves (magnetic field resonance). As represented by near field communication (NFC), the HF system is often used in systems where the communication distance is small, in the order of a few centimeters to a few tens of centimeters, due to the access range constraint under magnetic field strength. In particular, since the HF system has such characteristic, it provides convenience in one-on-one communication, i.e. individual communication.

It should be noted that, in either system, the IC tag contains no power supply for operations in order to achieve miniaturization, light weight and low cost of IC tags. The IC tags of a type (i.e. a passive type) are mainly utilized, in which a power supply for operations is secured by generating an electromotive force based on the electric waves transmitted from a reader device.

PRIOR ART DOCUMENTS

Patent Documents

[Patent Document 1] Japanese Laid-Open Patent Application No. 2010-198394

[Patent Document 2] Japanese Laid-Open Patent Application No. 2013-106076

SUMMARY OF THE INVENTION

Problems to be Solved by the Invention

However, for the IC tags of a hybrid type described in the patent documents above, which has two communication systems having different frequency bands, it is difficult to realize interference avoidance of antennae, securement of antenna gain, minimization, cost reduction, and the like.

The present invention is made in order to solve the above-described problem, and an object thereof is to provide a highly convenient and downsizable terminal unit, which realizes, even when more than two contactless information communication devices, each utilizing a different frequency band, are mounted on a single IC tag, good communication in each of the different frequency bands.

Means for Solving the Problems

In order to solve the above-described problem, the contactless information communication terminal device according to the present invention is a contactless information communication terminal device that performs transmission and reception of a signal in a contactless manner with a plurality of communication devices that use different frequencies when performing transmission. Such contactless information communication terminal device includes: a base material; a first antenna unit that is formed on the base material and that transmits and receives a first signal having a first frequency; a first processing circuit that is connected to the first antenna unit and that, when the first signal is received by the first antenna unit, performs a predetermined first process based on the first signal and that outputs a signal corresponding to the processed results, as a first processed signal, to the first antenna unit; a second antenna unit that is formed on the base material and that transmits and receives a second signal having a second frequency, which is different from the first frequency; and a second processing circuit that is connected to the second antenna unit and that, when the second signal is received by the second antenna unit, performs a predetermined second process based on the second signal and that outputs a signal corresponding to the processed results, as a second processed signal, to the second antenna unit, and has a configuration by means of which the first antenna unit and the second antenna unit are isolated from each other and establish electric-field coupling with each other.

Based on this configuration, for the contactless information communication terminal device according to the present invention, since the first antenna unit and the second antenna unit are electric-field coupled, the first antenna unit or the second antenna unit can be utilized for transmission and reception of another antenna unit, and, since the first antenna unit and the second antenna unit are isolated from each other, interference of the antenna unit by the counterpart antenna unit can be prevented.

Accordingly, when, for example, two contactless information communication functions, such as for the UHF band and the HF band, are mounted and the respective information communications are to be carried out, the contactless information communication terminal device according to the present invention is capable of enlarging the effective area of one antenna unit by means of two antennae, and maintaining and improving the gain of the transmitted/received signals while eliminating the influence caused by the other antenna unit.

In particular, the contactless information communication terminal device according to the present invention has a larger effect at the time of transmitting and receiving a signal that has a high degree of contribution to communication efficiency by the gain of the antenna unit, such as a UHF signal, than proximity communication of a few centimeters to a few tens of centimeters, such as an HF signal, or the like.

In consequence, the contactless information communication terminal device according to the present invention is capable of providing a highly convenient and downsizable terminal unit that accomplishes good communication in each of the different frequency bands.

Effect of the Invention

The contactless information communication terminal device according to the present invention and the like are capable of providing a highly convenient and downsizable terminal unit that accomplishes good communication in each of the different frequency bands.

BRIEF DESCRIPTION OF THE DRAWINGS

FIG. 1A is a diagram showing the configuration of a first surface of an IC tag in a first embodiment according to the present invention.

FIG. 1B is a diagram showing the configuration of a second surface of an IC tag in a first embodiment according to the present invention.

FIG. 12A is a diagram showing the configuration of comparison target 1 for comparing with the IC tag of the first embodiment.

FIG. 12B is a diagram showing the configuration of comparison target 1 for comparing with the IC tag of the first embodiment.

FIG. 13A is a diagram showing the configuration of comparison target 2 for comparing with the IC tag of the first embodiment.

FIG. 13B is a diagram showing the configuration of comparison target 2 for comparing with the IC tag of the first embodiment.

FIG. 17A is a diagram showing the configuration of a first surface of a base material of an IC tag of a fourth embodiment.

FIG. 17B is a diagram showing the configuration of a second surface of a base material of an IC tag of a fourth embodiment.

FIG. 18A is another example of the diagram showing the configuration of the first surface of the base material of the IC tag of the fourth embodiment.

FIG. 18B is another example of the diagram showing the configuration of the second surface of the base material of the IC tag of the fourth embodiment.

EMBODIMENTS OF THE INVENTION

Hereinafter, embodiments of the present invention will be described with reference to the drawings. It should be noted that the following embodiments are embodiments in which the contactless information communication terminal device, the card-type device, the mobile phone or the wearable device according to the present invention are applied to an IC tag which is usable in two communication frequency bands of the UHF band and the HF band. In the present embodiments, while the description is set forth using the UHF band and the HF band, or the UHF communication system ("UHF system") and the HF communication system ("HF system") that respectively make use of the UHF communication band and the HF communication band, the present invention is not limited to these frequency bands, as long as the two frequency bands are different.

[1] IC Tag

[1.1] Outline of IC Tag

Figure 2:
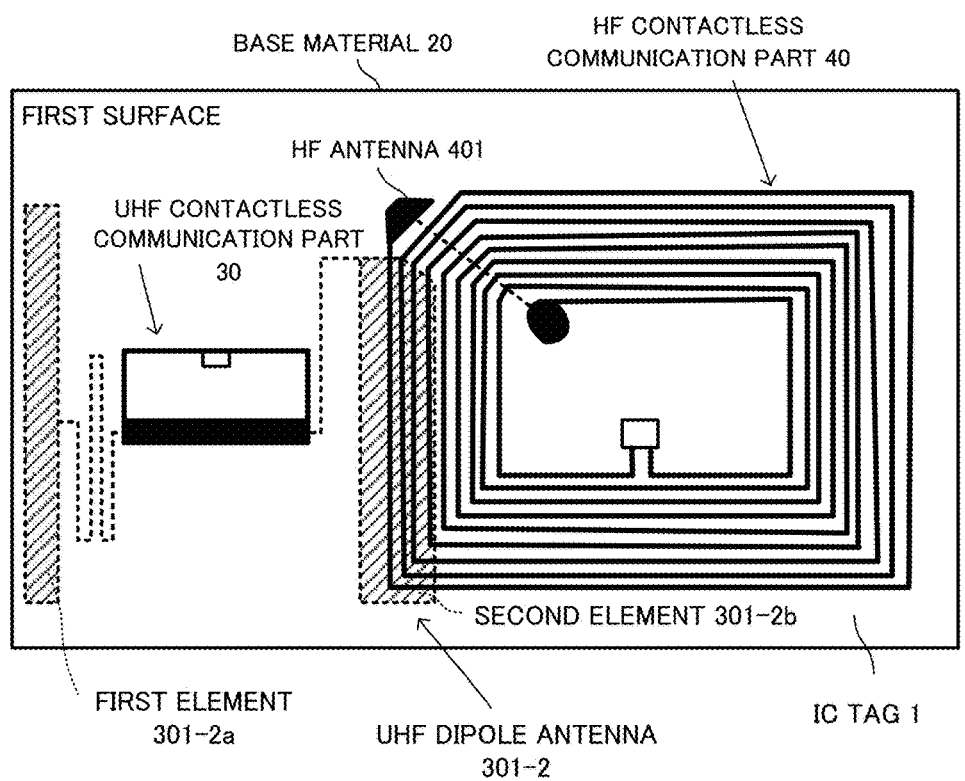
FIG. 2 is a diagram showing the positional relationship between a circuit in the first surface and the second surface of the IC tag of the first embodiment.

First, the outline and the configuration of IC tag 1 of the present embodiment will be described with reference to FIGS. 1 and 2. It should be noted that FIGS. 1A and 1B contain diagrams showing the configuration of a first surface and a second surface of IC tag 1 in the present embodiment and that FIG. 2 is a diagram showing the positional relationship between a circuit in the first surface and the second surface of IC tag 1 in the present embodiment. The second surface shown in FIG. 1B has a front and back relationship with the first surface shown in FIG. 1A with respect to base material 20.

IC tag 1 of the present embodiment is a single structure in which two contactless information communication parts (circuit units, such as an inlay, inlet, chip or the like), which utilizes different frequency bands (for example, the HF band and the UHF band, which is higher than the HF band), are provided, and in which transmission and reception of signals are performed with two antennae being electric-field-coupled to each other.

IC tag 1 of the present embodiment is capable of: enlarging the effective area of the UHF antenna, when seen from the side of a reader device (not shown); miniaturizing IC tag 1 itself; maintaining and improving the Q value or antenna gain of each frequency band; and improving communication efficiency (or distance) and communication accuracy corresponding to the signal processing of the two frequency bands without making the transmission and the reception of the signals interfere with each other.

It should be noted that, in IC tag 1 of the present embodiment, a significant improvement in communication efficiency can be seen in the case of a high frequency band with a large communication distance, such as the UHF band.

Specifically, as shown in FIGS. 1(A) and 1(B), IC tag 1 of the present embodiment is provided with: base material 20; UHF contactless communication part 30, which is formed on base material 20 and which is to be used for the UHF communication system that utilizes the UHF band (communication mode: electrical waves); and HF contactless communication part 40, which is formed on the base material 20 and which is to be used for the HF communication system that utilizes the HF band (communication mode: magnetic field resonance).

UHF contactless communication part 30 has a configuration by means of which, a signal transmitted from a reader device (not shown) for the UHF system is received, an electromotive force is generated based on the received signal, and transmission and reception of signals with the reader device are performed by utilizing such electromotive force.

As shown in FIGS. 1(A) and 1(B), UHF contactless communication part 30 is provided with: UHF antenna 301, which is formed by UHF loop antenna 301-1 formed on a first surface of base material 20 and UHF dipole antenna 301-2 formed on a second surface of base material 20; and UHF IC 302, which is formed as a single circuit unit (for example, an IC chip) on the first surface and is connected to UHF loop antenna 301-1.

In particular, UHF loop antenna 301-1 and UHF dipole antenna 301-2 are formed so as to be electric-field-coupled to each other via base material 20, and UHF antenna 301 functions as a single loop and dipole antenna for transmitting and receiving signals in the UHF band. UHF dipole antenna 301-2 has first element 301-2a and second element 301-2b formed on the second surface of base material 20.

It should be noted that UHF dipole antenna 301-2 of the present embodiment may be substituted by a slit antenna, a bent-slot antenna, or the like.

In addition, first element 301-2a and second element 301-2b of UHF dipole antenna 301-2 of the present embodiment are formed by, for example, a conductive material such as aluminum or the like.

HF contactless communication part 40 has a configuration by means of which, a signal transmitted from a reader device (not shown) for the HF system is received, an electromotive force is generated based on the received signal, and transmission and reception of signals with the reader device are performed by utilizing such electromotive force.

HF contactless communication part 40 is provided with: HF antenna 401 formed on the first surface of base material 20; HF IC 402 which is formed on the first surface as a single circuit unit (for example, an IC chip) different from UHF IC 302 and which is connected to HF antenna 401; and HF jumper wire 60 which is formed on the second surface and which connects one end of HF antenna 401 to the other end thereof.

In particular, HF jumper wire 60 is formed at the position in the second surface where termination part-formed areas of HF antenna 401 are short-circuited to each other. The termination parts of HF antenna 401 are short-circuited to each other by means of HF jumper wire 60 via base material 20 in order to configure an HF magnetic field resonance coil. However, this point is similar to the conventional contactless information communication terminal device and thus, the details thereof will be omitted.

It should be noted that the conducting material that configures HF antenna 401 is arbitrary; however, in the present embodiment, conductive materials, such as a copper wire, aluminum foil, copper foil, conductive resin, conductive ink, metal deposited film or the like, may be used for the sake of reducing the manufacturing costs of the antenna. Moreover, HF antenna 401 is formed by means of copper windings or by way of aluminum etching, or the like.

On the other hand, as shown in FIGS. 1A and 1B, on the first surface of IC tag 1 of the present embodiment, HF antenna 401 and UHF loop antenna 301-1 are provided with a space therebetween.

In addition, as shown in FIG. 2, on the second surface of IC tag 1 of the present embodiment, second element 301-2b of UHF dipole antenna 301-2 is located at the position overlapping with HF antenna 401 via base material 20.

In particular, second element 301-2b of UHF dipole antenna 301-2 establishes electric-field coupling with HF antenna 401 via base material 20, and thus, second element 301-2b allows part of HF antenna 401 to function as part of UHF antenna 301 when transmitting and receiving signals in the UHF band, and second element 301-2b can therefore be used for transmission and reception of signals in the UHF band.

In the present embodiment, UHF loop antenna 301-1, UHF dipole antenna 301-2 and HF antenna 401 are electric-field coupled. The total characteristic impedance in such electric-field coupled state is matched with input impedance of UHF IC 302 and HF IC 402.

Additionally, HF jumper wire 60 and UHF dipole antenna 301-2 are isolated from each other.

In the present embodiment, by having such configuration, for example, HF antenna 401 can be used for transmission and reception of another antenna unit (i.e. UHF antenna 301), and since UHF antenna 301 and HF antenna 401 can be located such that they are isolated from each other, the influence caused by UHF antenna 301 on the transmission and reception of electrical waves at HF antenna 401 (i.e. interference with the antenna unit) can be reduced.

Generally, a hybrid type IC tag having communication systems of different frequency bands, such as the UHF band, the HF band or the like, requires contactless information communication devices (including an inlay, inlet, chip or the like) corresponding to both communication systems, to be mounted thereon. For this reason, in such IC tag, regarding the respective antennae, one antenna acts as a metal strip for the other antenna and thus, the antennae in the respective contactless information communication devices interfere with each other and accordingly it is often difficult, especially in the UHF side contactless information communication device, to secure antenna gain.

Moreover, in such hybrid type IC tag, it is difficult to achieve both miniaturization and cost reduction due to the shape and location positions of the antennae.

Accordingly, in the present embodiment, by having the configuration as described above, the effective area of the antenna unit can be enlarged by means of two antennae units, and the gain of the transmitted/received signals can be maintained and improved while excluding the influence of the other antenna units.

In addition, in IC tag 1 of the present embodiment, both antennae 301 and 401 establish electric-field coupling, and the influence caused by the reflection or interference of the signals can be reduced when transmitting or receiving the signals and therefore, communication efficiency can be improved.

Accordingly, in the present embodiment, good communication in each of the different frequency bands can be accomplished, and a highly convenient and downsizable terminal unit can be provided.

It should be noted that UHF antenna 301 having UHF loop antenna 301-1 and UHF dipole antenna 301-2 of the present embodiment configures a first antenna unit of the present invention and that HF antenna 401 configures a second antenna unit of the present invention.

In addition, for example, UHF IC 302 and HF IC 402 of the present embodiment respectively configure a first processing circuit and a second processing circuit of the present invention, and first element 301-2a and second element 301-2b of the present embodiment respectively configure a first element and a second element of the present invention.

Moreover, for example, UHF loop antenna 301-1 configures antenna A of the present invention and UHF dipole antenna 301-2 configures antenna B of the present invention.

[1.2] Equivalent Circuit of IC Tag

Next, the outline and the configuration of IC tag 1 of the present embodiment will be described with reference to FIG. 3. It should be noted that FIG. 3 is a diagram showing an equivalent circuit of IC tag 1 of the present embodiment.

Figure 3:
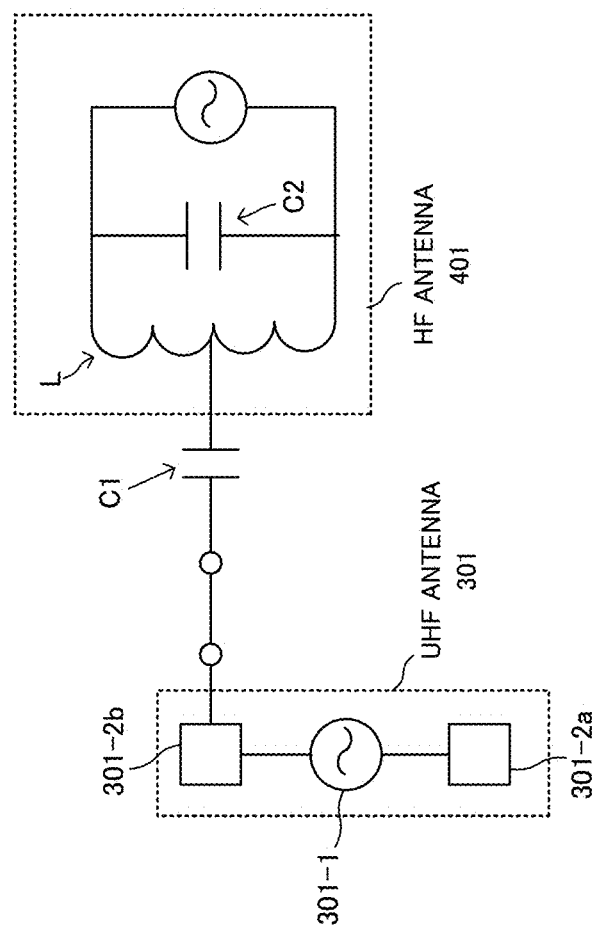
FIG. 3 is a diagram showing an equivalent circuit of the IC tag of the first embodiment.

As shown in FIG. 3, IC tag 1 of the present embodiment is equivalent to the state in which first element 301-2a is connected to one end of UHF loop antenna 301-1 and second element 301-2b is connected to the other end thereof, and in which UHF antenna 301 and HF antenna 401 are connected to each other via capacitor C1 that is formed by second element 301-2b, HF antenna 401 and base material 20 sandwiched therebetween.

In particular, as shown in FIG. 3, HF antenna 401 is equivalent to an LC circuit consisting of inductor L and parasitic capacitor C2, and since UHF loop antenna 301-1 and HF antenna 401 establish electric-field coupling via UHF dipole antenna 301-2 and base material 20 even when signals in the UHF band are transmitted/received, part of or the entire HF antenna 401 is made to function as part of UHF antenna 301 even at the time of transmitting/receiving signals in the UHF band, and UHF loop antenna 301-1 and HF antenna 401 can therefore be made to function as a single antenna under such coupled state.

According to such configuration, IC tag 1 of the present embodiment is capable of: enlarging the effective area of UHF antenna 301, when seen from the reader device (not shown) for the UHF system; improving the gain of the UHF antenna; and improving communication accuracy while extending the distance over which the communication can be made.

[1.3] Configuration of IC

Next, UHF IC 302 and HF IC 402 to be mounted on IC tag 1 of the present embodiment will be described with reference to FIG. 4.

Figure 4:
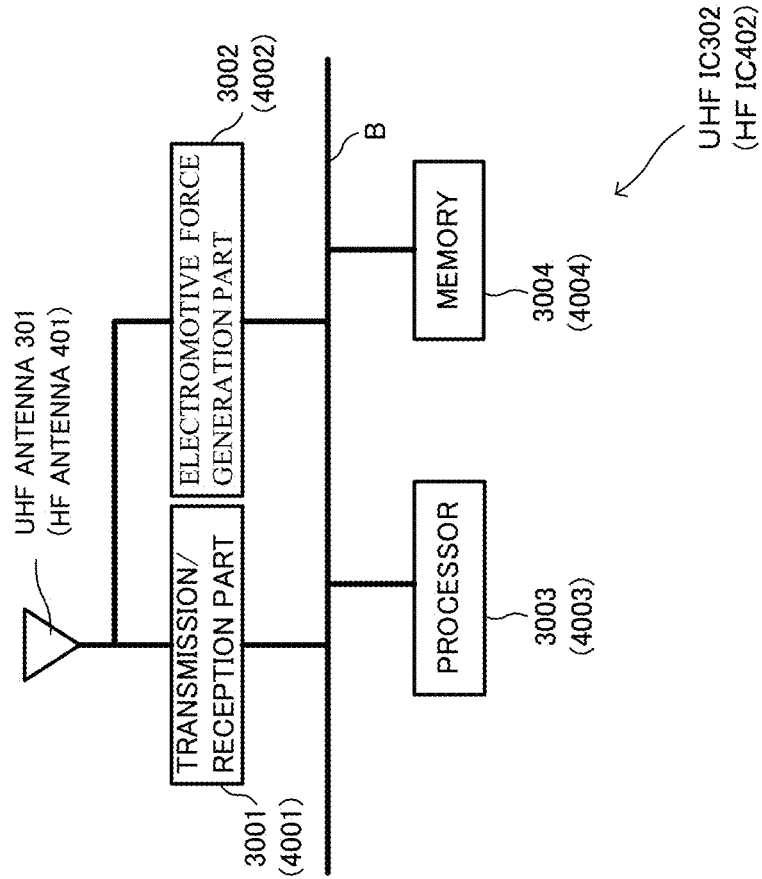
FIG. 4 is a block diagram showing the functional configuration of a UHF IC (HF IC) mounted on the IC tag of the first embodiment.

It should be noted that FIG. 4 is a block diagram showing the configuration of UHF IC 302 and HF IC 402 to be mounted on the IC tag of the present embodiment. UHF IC 302 and HF IC 402 have essentially the same configuration and thus, in the following, unless stated otherwise, the respective parts shown in FIG. 4 share a common configuration and function in UHF IC 302 and HF IC 402.

In each of UHF IC 302 or HF IC 402 of the present embodiment, a processing circuit for performing reception and other processing of UHF or HF signals is formed, and each processing circuit has a configuration by means of which appropriate processing is performed in accordance with the below-described utility forms.

In particular, as shown in FIG. 4, UHF IC 302 (HF IC 402) of the present embodiment includes: transmission/reception part 3001 (transmission/reception part 4001) that mediates signal transmission and reception between UHF antenna 301 (HF antenna 401) and bus B; electromotive force generation part 3002 (electromotive force generation part 4002) that generates a electromotive force based on the signals received by the antenna and supplies the same to bus B: processor 3003 (processor 4003) that performs predetermined processing; and memory 3004 (memory 4004), and these components are connected to each other via bus B.

Transmission/reception part 3001 (transmission/reception part 4001) transmits and receives signals of the frequency band used in a corresponding system, and thus, includes: a down-converter for down-converting radio frequency (RF) signals into baseband signals: an up-converter for up-converting baseband signals into RF signals; a filter circuit; a modulator/demodulator; a digital-analog converter (DAC); and an analog-digital converter (ADC).

However, regarding transmission/reception part 3001 and transmission/reception part 4001, the circuit configuration differs between UHF IC 302 and HF IC 402 in accordance with the frequency band (the UHF band or the HF band) used for the system.

Electromotive force generation part 3002 (electromotive force generation part 4002) generates an electromotive force based on the signals received by transmission/reception part 3001 (transmission/reception part 4001) and supplies the same to bus B. It should be noted that the respective parts of UHF IC 302 (HF IC 402) acquire this supplied power from bus B and utilize the same as a power supply.

Processing part 3003 (processor 4003) performs predetermined processing in accordance with a protocol determined in the UHF system (HF system).

Memory 3004 (memory 4004) is a non-volatile memory having a predetermined recording region and identification information is recorded in such recording region. In particular, the identification information recorded in memory 3004

(memory 4004) is changed as described below in accordance with the utilization purposes of IC tag 1.

It should be noted that UHF IC 302 may be located at any location on base material 20 as long as it is impedance-matched with UHF antenna 301. For example, in the example of FIGS. 1A and 1B of the present embodiment, UHF IC 302 is located at the center of the upper part of UHF loop antenna 301-1 on the first surface.

In addition, similarly to UHF IC 302, HF IC 402 may be located at any location on base material 20 as long as it is impedance-matched with HF antenna 401. However, HF IC 402 may preferably be located at, for example, a position that is separated by a predetermined distance to the lower side from the center of the HF antenna on the first surface.

(1) Utilization in Article Management

Article attribute information, including name, part number, serial number or the like of the target articles, is recorded in memory 3004 (memory 4004) as the identification information. In particular, in the case of a UHF system, when a large number of articles are moved in an assembly-line operation (for example, when articles are to be shipped from a factory), the identification information is read from all IC tags 1 attached to the articles ready for shipment by a reader device (for example, a gate-type reader device). In the case of an HF system, when the articles are delivered to a store, the identification is read using a reader device (for example, a hand-held-type reader device).

It should be noted that, when the above-described method (1) is employed, IC tag 1 of the present embodiment is capable of performing article distribution and production management by switching the communication modes to be used between the UHF system and the HF system, when necessary, depending on the received signals.

(2) Utilization in User Management (Security Management)

User attribute information, at least including user identification ID (employee number, room number, user ID or the like), is recorded in memory 3004 (memory 4004) as the identification information. For example, in terms of a UHF system, a reader device is provided at a doorway of a collective housing area, such as an apartment, or of an office building, or at a gate or other gateway to a parking space of such collective housing area or office building, and IC tag 1 is utilized as a key for opening and closing a door or gate located at such doorway by reading out the identification information. In terms of an HF system, a reader device is provided at a doorway to an individual room, floor or part thereof, and IC tag 1 is used as a key for opening and closing a door located at such doorway by reading out the identification information.

It should be noted that, when above-described method (2) is employed, IC tag 1 of the present embodiment is capable of preventing illegal entrance into the apartment or the office building and of being utilized for managing entrance into a personal room, clocking in and out of employees or entrance of an individual or an employee into a room by switching the communication modes to be used between the UHF system and the HF system, when necessary, depending on the received signals.

(3) Utilization in Electronic Wallets, Etc.

Not only a user ID but also electronic money information is recorded in memory 3004 (memory 4004) as the identification information. In particular, in the case of a UHF system, such user ID and electronic money information are read out when financial transactions (including not only direct transactions but also indirect transactions where other charging servers are involved) are conducted at a gate at which entrance and exit are made on a car basis, such as an electronic toll collection (ETC) system. In the case of an HF system, the user ID and electronic money information are read out when financial transactions are conducted on an individual basis on public transportation systems or the like.

It should be noted that, when the above-described method (3) is employed, IC tag 1 is capable of being utilized for making payment at the time of shopping, of being utilized as a pre-paid ticket, and of rapid processing, in a cash-less manner, even when a passing-through time and communication distance is long, such as for the ETC system, by switching the communication modes to be used between the UHF system and the HF system, when necessary, depending on the received signals.

[1.4] Simulations and Experimental Results

[1.4.1] Communication Characteristic of UHF Antenna (Simulation)

Next, the simulation results of the communication characteristic of UHF antenna 301 configured from UHF loop antenna 301-1 and UHF dipole antenna 301-2 in IC tag 1 of the present embodiment will be described with reference to FIGS. 5 to 11.

Figure 5:
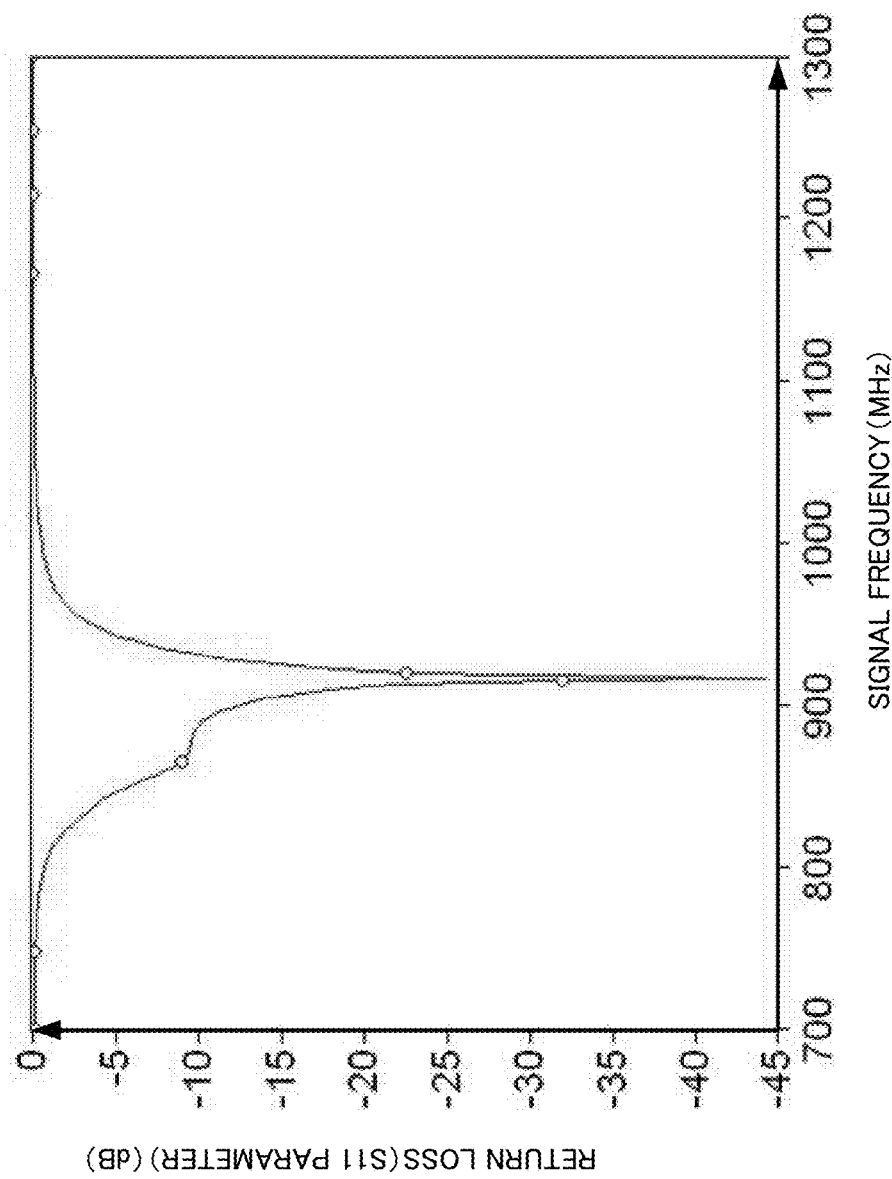
FIG. 5 is a graph showing the results of analyzing, by a simulator, the impedance characteristic of a UHF antenna mounted on the IC tag of the first embodiment.
Figure 6:
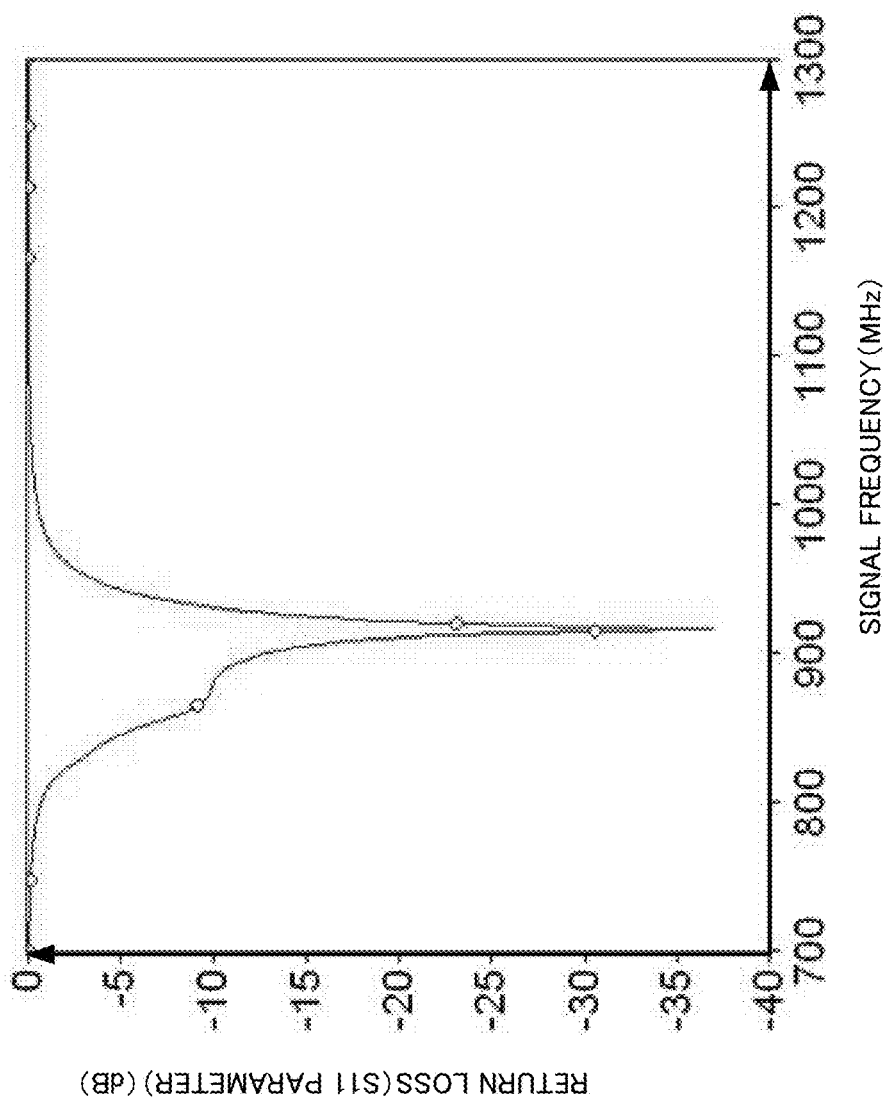
FIG. 6 is a graph showing the results of analyzing, by a simulator, the impedance characteristic of a UHF antenna when an HF antenna is kept and only the HF IC is removed from the IC tag of the first embodiment.

FIG. 5 is a graph showing the results of analyzing, by a simulator, the impedance characteristic of UHF antenna 301 mounted on IC tag 1 of the present embodiment; FIG. 6 is a graph showing the results of analyzing, by a simulator, the impedance characteristic of the UHF antenna when the HF antenna is kept and only the HF IC is removed from IC tag 1 of the present embodiment; and FIG. 7 is a graph showing the results (comparison example) of analyzing, by a simulator, the impedance characteristic of the UHF antenna when the present embodiment tag, the HF antenna and the HF IC are not present in IC tag 1 of the present embodiment.

Figure 7:
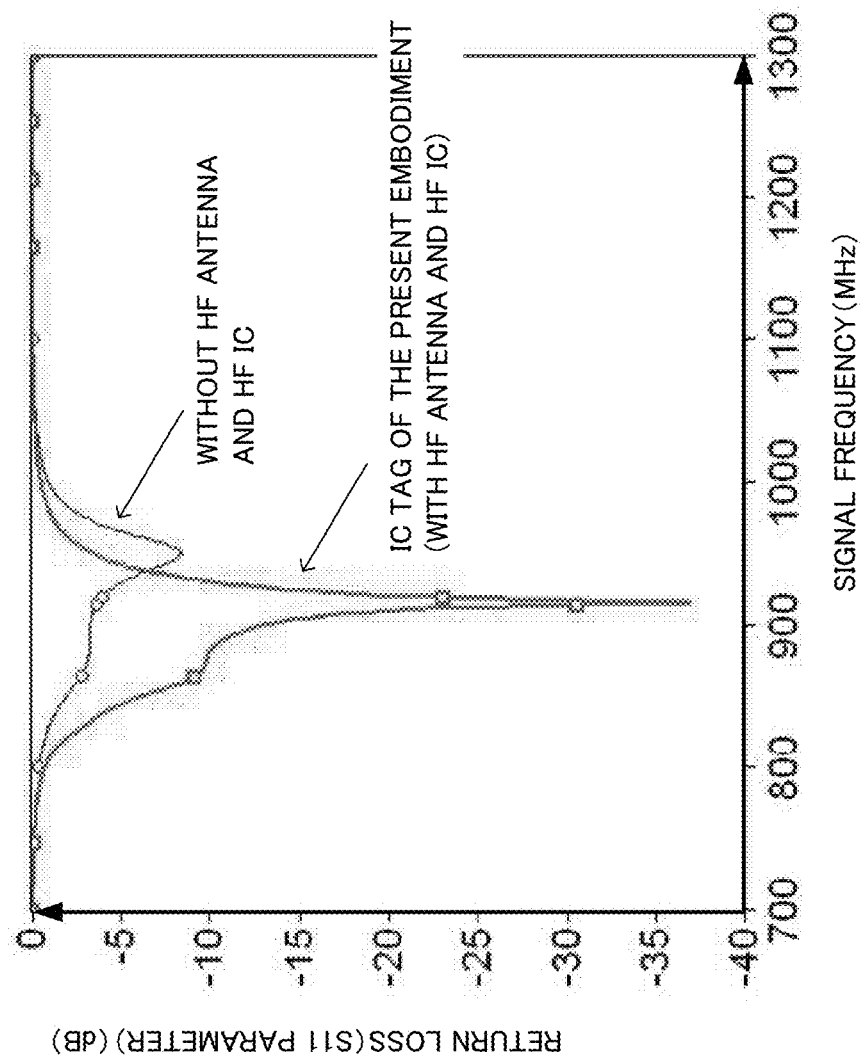
FIG. 7 is a graph showing the results (comparison example) of analyzing, by a simulator, the impedance characteristic of a UHF antenna when the present embodiment tag, an HF antenna and the HF IC are not present in the IC tag of the first embodiment.

In particular, FIGS. 5 to 7 show the simulation results with the signal frequency being represented on the horizontal axis and the dB value (decibel value) of the S11 parameter of the scattering matrix (S-matrix), which indicates a return loss (reflection loss) at UHF antenna 301, being represented on the vertical axis.

Figure 8:
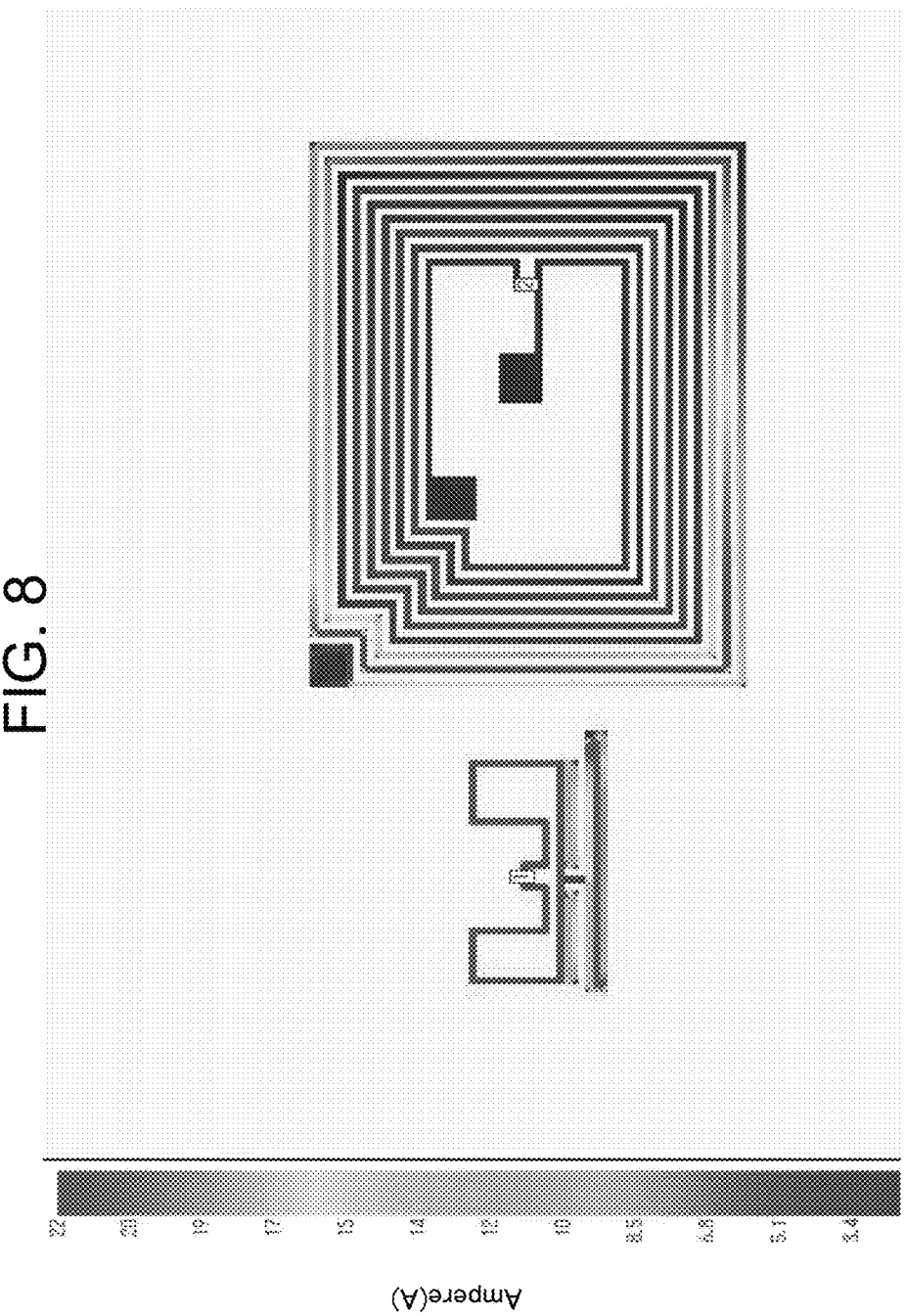
FIG. 8 is a diagram showing the results of analyzing, by a simulator, the situation in which the current density generated in the first surface of a base material changes when a signal of 920 MHz is received by the IC tag of the first embodiment.
Figure 9:
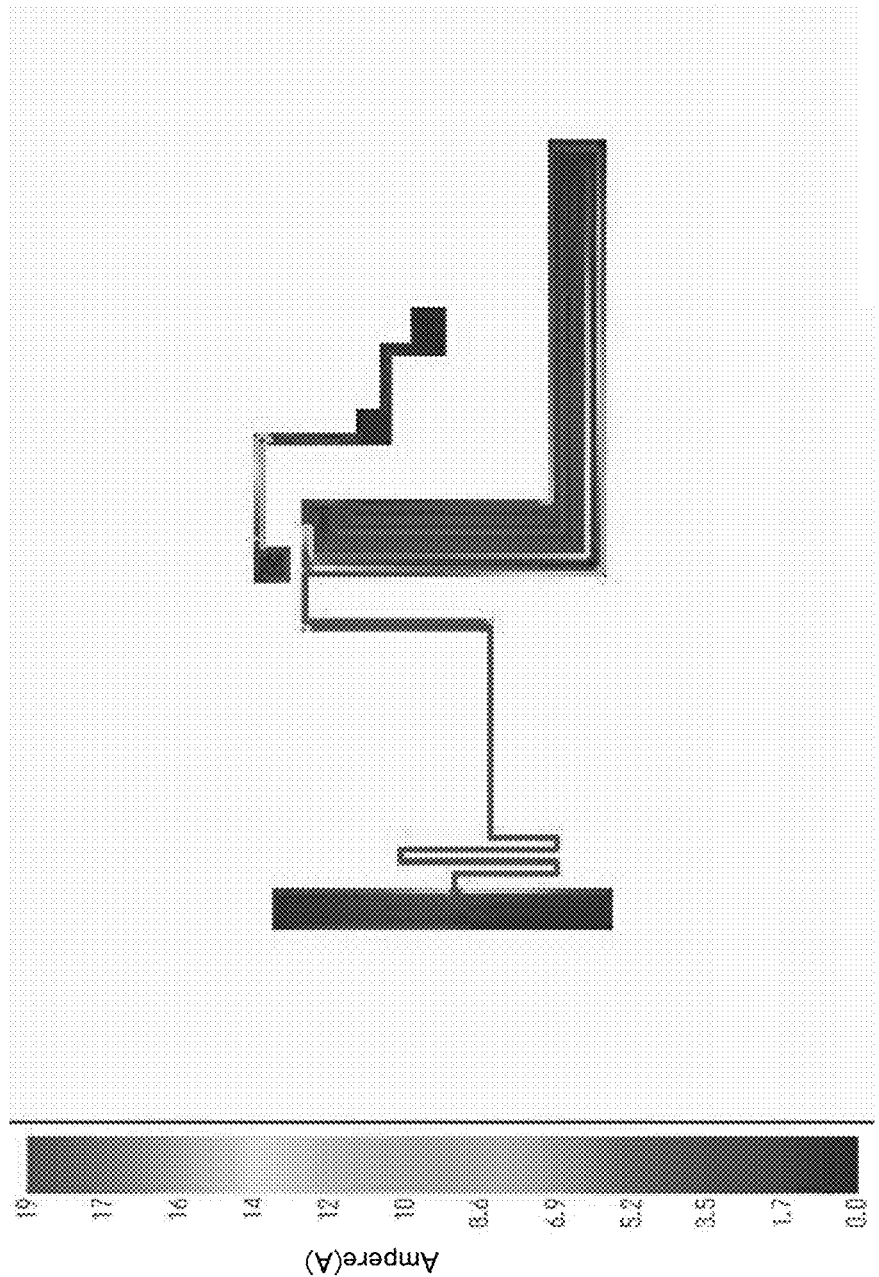
FIG. 9 is a diagram showing the results of analyzing, by a simulator, the situation in which the current density generated in the second surface of the base material changes when a signal of 920 MHz is received by the IC tag of the first embodiment.

In addition, FIGS. 8 and 9 are diagrams showing the results of analyzing, by a simulator, the situation in which the current density generated in the first surface or the second surface of base material 20 changes when a signal of 920 MHz is received by IC tag 1 of the present embodiment.

Figure 10:
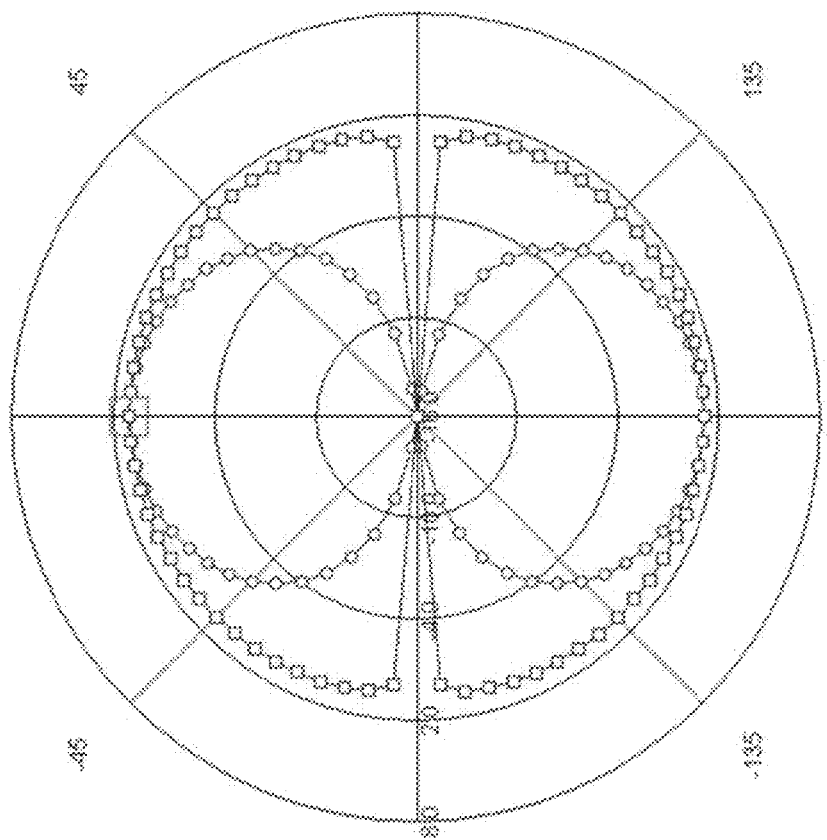
FIG. 10 is a diagram showing the results of analyzing, by a simulator, the gain of the UHF antenna in the IC tag of the first embodiment.
Figure 11:
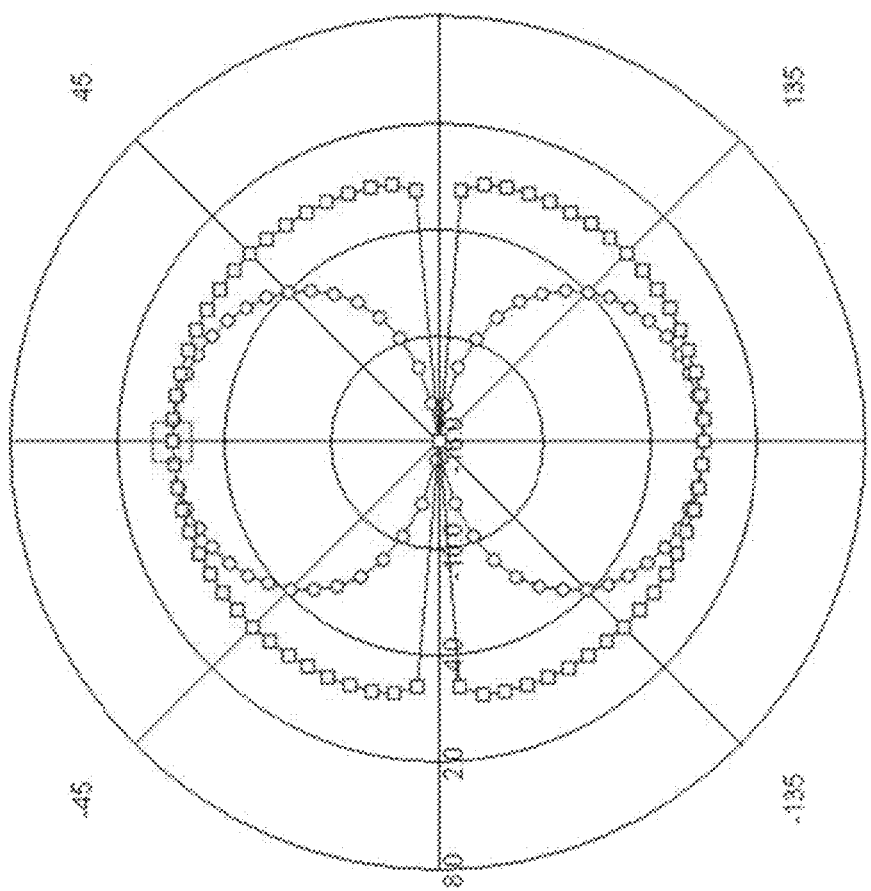
FIG. 11 is a diagram showing the results (comparison example) of analyzing, by a simulator, the gain of the UHF antenna when the HF antenna and the HF IC are not present in the IC tag of the first embodiment.

Furthermore, FIG. 10 is a diagram showing the results of analyzing, by a simulator, the gain of UHF antenna 301 in IC tag 1 of the present embodiment and FIG. 11 is a diagram showing the results (comparison example) of analyzing, by a simulator, the gain of the UHF antenna when the HF antenna and the HF IC are not present in IC tag 1 of the present embodiment.

More specifically, FIG. 10 shows the gain of UHF antenna 301 when HF IC 402 having the impedance characteristic shown in FIG. 5 is mounted (i.e. the same condition with FIG. 5), and FIG. 11 shows the gain of UHF antenna 301 when HF antenna 401 is not mounted as in FIG. 7.

First, as shown in FIGS. 5 and 6, the return loss of UHF antenna 301 in the vicinity of 900 MHz is in the order of −45 dB, regardless of whether or not HF IC 402 is mounted on IC tag 1, and no shift of peak frequency due to the presence/absence of HF IC 402 is observed and the variation amount of the return loss is in the order of 5 dB.

Based on the above, it can be found that, even when either the configuration in which HF IC 402 is mounted or the configuration in which such HF IC 402 is not mounted, is used, IC tag 1 can still be utilized for transmission and reception of signals in the UHF band. In addition, the influence caused by HF IC 402 mounted on IC tag 1 on the transmission and reception of signals in the UHF band is very small, and thus, it can be seen that, even when HF IC 402 is mounted, the influence thereof on the transmission and reception of the signals in the UHF band is small.

Next, with reference to FIG. 7, it can be seen that, in the case of UHF antenna 301 under the circumstances where HF antenna 401 is removed, the return loss of UHF antenna 301 in the vicinity of 900 MHz is in the order of −5 dB and a shift of the peak frequency in the order of a few tens of MHz has occurred, whereas in the case of IC tag 1 of the present embodiment, the peak return loss of UHF antenna 301 appears in the vicinity of 900 MHz and the value thereof is improved to approximately −40 dB.

As a consequence, it can be seen that HF antenna 401, which establishes electric-field coupling with UHF dipole antenna 301-2 via base material 20, can contribute to improving the return loss value of UHF antenna 301.

In addition, as shown in FIG. 8, it can also be seen, from the electric current distribution in the first surface at the time of receiving 920 MHz signals, that part of HF antenna 401 makes a contribution to the reception of signals in the UHF band.

Further, as shown in FIG. 9, it can also be seen, from the electric current distribution in the second surface, that at the time of receiving 920 MHz signals, UHF loop antenna 301-1 and HF antenna 401 are coupled together via UHF dipole antenna 301-2. In other words, it can be seen, from the electric current distribution in the second surface, that UHF loop antenna 301-1 establishes electric-field coupling with UHF dipole antenna 301-2 and that second element 301-2*b* of UHF dipole antenna 301-2 establishes electric-field coupling with HF antenna 401 in region BD shown in FIG. 1A.

It should be noted that HF antenna 401 is short-circuited by means of HF jumper wire 60 and that HF antenna 401 forms one circuit by including HF jumper wire 60. Since such HF antenna 401 and HF jumper wire 60 cannot be considered separately, when the frequency of the UHF is applied, the current flows through HF jumper wire 60.

In addition, it is considered that electric-field coupling also exists between UHF loop antenna 301-1 and HF antenna 401 via the atmosphere present in the space therebetween. However, since a PET film has a higher dielectric constant than that of the atmosphere, it is considered that the capacitance on the UHF dipole antenna 301-2 side becomes large and that the electric-field coupling via UHF dipole antenna 301-2 becomes dominant. It is considered that the influence of the electric-field coupling via the atmosphere becomes extremely small as compared to the influence by the electric-field coupling via UHF dipole antenna 301-2.

In order to demonstrate the above-described validation results, a simulation was performed on the gain at 920 MHz of UHF antenna 301 (in which UHF loop antenna 301-1 and UHF dipole antenna 301-2 are coupled to each other) in IC tag 1 of present embodiment and the results as shown in FIG. 10 were thereby obtained. As a consequence, it was confirmed that, with IC tag 1 of the present embodiment, approximately 1.04 dBi of the gain of UHF antenna 301 could be secured.

On the other hand, a simulation was performed on the gain of UHF antenna 301, regarding a sample in which HF antenna 401 was removed from IC tag 1, in order to investigate the influence of HF antenna 401 on the gain of UHF antenna 301 and the results as shown in FIG. 11 were thereby obtained. As a consequence, it could be seen that only approximately −1.9 dBi of the gain of UHF antenna 301 could be secured.

Accordingly, the gain of UHF antenna 301 is improved by 1.04−(−1.09)=2.13 dBi by providing HF antenna 401. When the gain changes by 2.13 dBi in UHF antenna 301, the communication efficiency thereof changes significantly, and it can therefore be seen that UHF antenna 301 can obtain better communication efficiency (approximately by 1.6 times) as compared to a conventional product, owing to the configuration of the present embodiment.

[1.4.2] Communication Characteristic of HF Antenna (Experimental Results)

Next, the experimental results (the actual measured values) of the communication characteristic of HF antenna 401 in IC tag 1 of the present embodiment will be described with reference to FIGS. 12A to 14.

Figure 14:
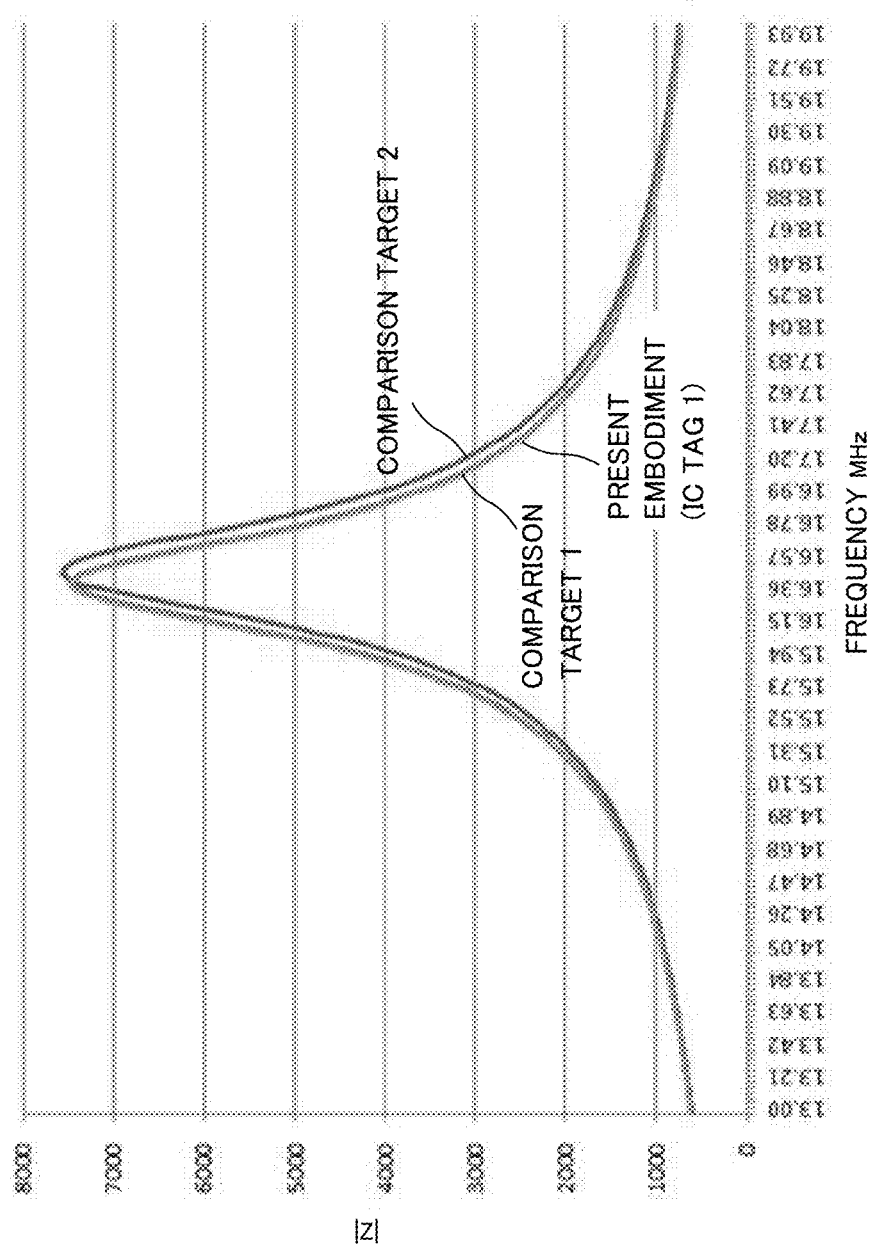
FIG. 14 is a graph in which experimental results (actual measured values) of impedance characteristics of the HF antennae are compared among the IC tag of the first embodiment and comparison targets 1 and 2.

It should be noted that FIGS. 12A, 12B, 13A and 13B are diagrams showing the configurations of comparison targets 1 and 2 for comparing with IC tag 1 of the present embodiment and that FIG. 14 is a graph in which experimental results (the actual measured values) of impedance characteristics of the HF antennae are compared among IC tag 1 of the present embodiment and comparison targets 1 and 2.

The present experimental results were obtained by, after creating IC tag 1 of the present embodiment and a prototype of comparison target 1 or 2, measuring the absolute value (Ω) of impedance Z, voltage Vs and phase θ in the created IC tag 1 and comparison target 1 or 2 using an impedance analyzer (HP4294A manufactured by Agilent Technologies).

It should be noted that FIG. 14 only represents impedance Z since it would become complicated if phase θ were to be mixed in the same graph. In addition, regarding the present experimental results, the experiments were conducted on IC tag 1 of the present embodiment and comparison target 1 or 2, while complying with general considerations, such as having the same person perform the measurement, suppressing the generation of capacitance at the measurement field, such as the table on which the measurement is performed, or the like.

On the other hand, for evaluating the antenna from the present experimental results, a change in Q value is important and thus, the Q value was derived from the present experimental results and a comparison thereof was made. In particular, a series equivalent circuit (the circuit in which coil L and resistor R are serial and such serial coil L and resistor R are parallel with capacitor C) and a parallel equivalent circuit (the circuit in which coil L, capacitor C and resistor R are all parallel) were used as the equivalent circuit model, and the values of L, C and R for each circuit were calculated and the Q value was calculated using the following Expression 1 and Expression 2.

$$Q = \omega CR = (\sqrt{CL} \times CR) \quad \text{(Expression 1)}$$

$$Q = \frac{1}{\omega CR} = (\sqrt{CL} \times CR) \quad \text{(Expression 2)}$$

It should be noted that Expression 1 is an expression for calculating the Q value in the parallel equivalent circuit and Expression 2 is an expression for calculating the Q value in the serial equivalent circuit.

As shown in FIGS. 12A and 12B, comparison target 1 is an IC tag in which UHF IC 302 is removed from IC tag 1 of the present embodiment, namely, a sample in which only UHF IC 302 is removed from IC tag 1 of the present embodiment.

Further, comparison target 2 is an IC tag in which UHF contactless communication part 30 is removed from IC tag 1 of the present embodiment, namely, a sample in which UHF loop antenna 301-1 and UHF IC 302 are removed from IC tag 1 of the present embodiment.

FIG. 14 shows the experimental results regarding the characteristic impedance of each of the thus-configured comparison targets 1, 2 or IC tag 1 of the present embodiment. It should be noted that, in FIG. 14, the horizontal axis represents frequency and the vertical axis represents the magnitude (ohm) of |Z| (real part) in the characteristic impedance of the HF antenna.

Moreover, Table 1 shows the actual measured values of resonance frequency, the calculation results based on the equivalent circuit of R1, C1 and L1, and the calculation results of the Q value, which is to be calculated from the calculation results of R1, C1 and L1, for comparison targets 1 and 2 and IC tag 1 of the present embodiment (in the case of the parallel equivalent circuit of Expression 1).

It should be noted that, in the present experimental results, resistance (value) R, capacitor (capacitance) C and coil (inductance L), which are calculated by the program within the above-described impedance analyzer, are used when an equivalent circuit is selected at the time of making a measurement of IC tag 1 and comparison target 1 or 2 with such impedance analyzer.

TABLE 1

|  | Resonance frequency (actual measured value) | Calculation results based on equivalent circuit | Q value |
| --- | --- | --- | --- |
| Present embodiment | 16.395 MHz | R1 11.503 Ω<br>C1 33.022 μF<br>L1 2.847 μH | 25.5 |
| Comparison target 1 | 16.395 MHz | R1 11.458 Ω<br>C1 33.038 μF<br>L1 2.843 μH | 25.6 |
| Comparison target 2 | 16.465 MHz | R1 11.342 Ω<br>C1 32.697 μF<br>L1 2.847 μH | 26.0 |

As shown in FIG. 14, according to the experimental results, the HF antenna characteristics in IC tag 1 of the present embodiment and comparison target 1 substantially overlap with each other and both have a peak in the vicinity of 16.4 MHz (i.e. resonance frequency), and almost no shift in the frequency and no change in the magnitude are observed.

In addition, the Q value in HF antenna 401 in IC tag 1 of the present embodiment is 25.5 and the Ω value of the HF antenna in comparison target 1 is 25.6, and the change rate thereof is approximately 0.4%. From this, it can also be seen that the antenna characteristics of IC tag 1 and comparison target 1 are substantially the same.

Accordingly, based on these results, it can be confirmed that whether or not UHF IC 302 is mounted has no influence on the gain and the frequency characteristic of HF antenna 401.

In addition, as shown in FIG. 14, regarding the HF antenna characteristics in IC tag 1 of the present embodiment and comparison target 2, a small shift in the peak frequency occurs; however, it can be seen that such change is not enough to influence the signal reception.

In addition, the Q value of HF antenna 401 in IC tag 1 of the present embodiment is 25.5, the Q value of the HF antenna in comparison target 2 is 26.0, and the change rate thereof is approximately 2.0%. From this, it can also be seen that the change in the antenna characteristics of comparison target 2 is not enough to influence the signal reception.

Namely, based on these results, it can be proved that, even when UHF loop antenna 301-1 is mounted on IC tag 1, UHF antenna 301 has no adverse effect on the transmission and reception of signals in the HF band.

As described above, IC tag 1 of the present embodiment has a configuration in which: UHF contactless communication part 30 and HF contactless communication part 40 are provided on a first surface of base material 20; UHF antenna 301 (UHF loop antenna 301-1 and UHF dipole antenna 301-2) and HF antenna 401 are located, on the first surface, at positions spaced apart from each other; and at the time of receiving UHF signals, UHF antenna 301 and HF antenna 401 establish electric-field coupling with each other via UHF dipole antenna 301-2 formed on a second surface of base material 20. Thus, part of HF antenna 401 can be used for transmission and reception of signals in the UHF band, and the effective area is expanded when seen from a reader device for UHF antenna 301, and the maintenance and improvement of the gain are possible.

As a consequence, even when two or more contactless information communication terminal devices (i.e. UHF contactless communication part 30 and HF contactless communication part 40), which respectively utilize different frequency bands (i.e. the UHF band and the HF band), are mounted, IC tag 1 of the present embodiment is favorably capable of achieving: maintenance of and improvement in the gain of UHF antenna 301; avoidance of an increase in the size of the IC tag; and communication in the different frequency bands.

[2] Second Embodiment

Figure 15:
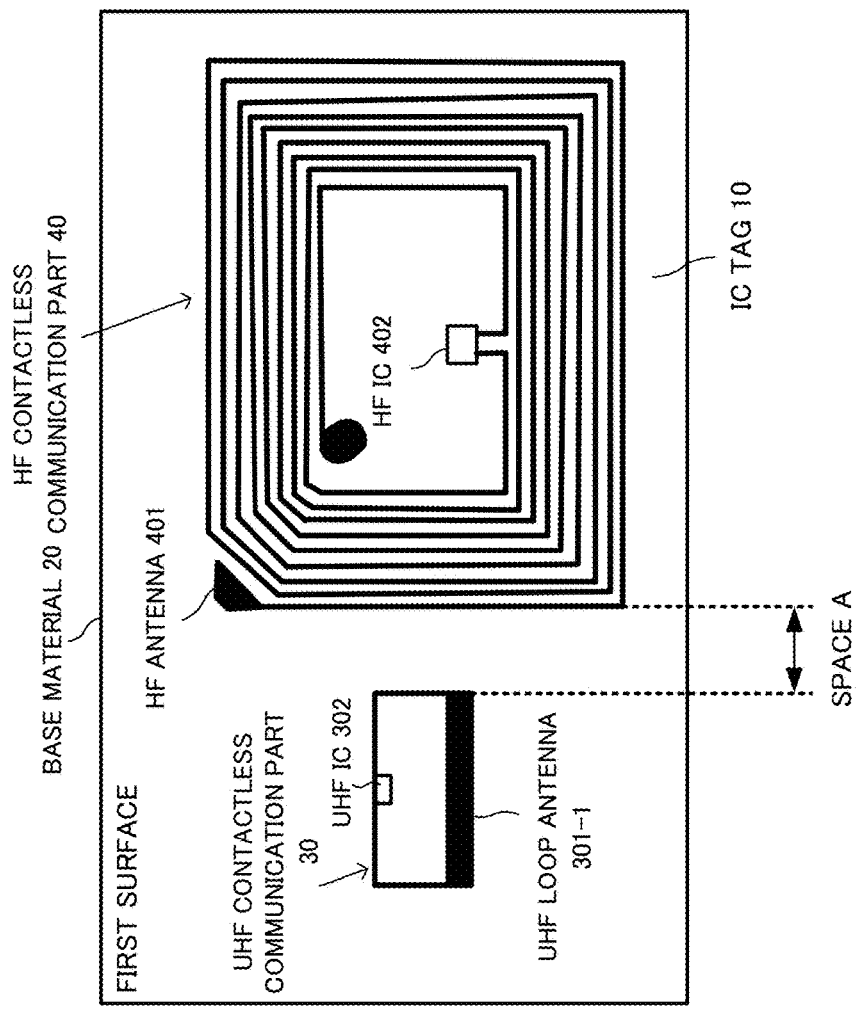
FIG. 15 is a diagram showing the configuration of an IC tag of a second embodiment.

Next, the second embodiment of the contactless information communication terminal device according to the present invention will be described with reference to FIG. 15. It should be noted that FIG. 15 is a diagram showing the configuration of IC tag 10 of the second embodiment. In FIG. 15, components similar to those of FIGS. 1A and 1B are provided with similar reference numbers.

As shown in FIG. 15, in IC tag 10 of the present embodiment, similarly to IC tag 1 of the first embodiment, UHF contactless communication part 30 and HF contactless communication part 40 are located on the first surface of base material 20 with a space therebetween, and space A is provided between UHF contactless communication part 30 and HF contactless communication part 40. The separation distance indicating space A is, for example, preferably 0.5 mm or less.

However, unlike the first embodiment, no UHF dipole antenna 301-2 is provided on the second surface of base material 20 of IC tag 10 of the present embodiment. Namely, IC tag 10 of the present embodiment has a configuration in which UHF dipole antenna 301-2 is removed from IC tag 1 of the first embodiment.

HF jumper wire 60 is not particularly shown; however, it is considered that such HF jumper wire 60 is provided. In addition, when performing transmission and reception of signals, UHF loop antenna 301-1 and HF antenna 401 have a configuration by means of which electric-field coupling is established with each other via space A.

Based on this configuration, IC tag 10 of the present embodiment uses part of HF antenna 401 for transmission and reception of signals in the UHF band and is capable of expanding the effective area when seen from a reader device for UHF antenna 301, as well as being capable of maintaining and improving the gain.

[3] Third Embodiment

Figure 16:
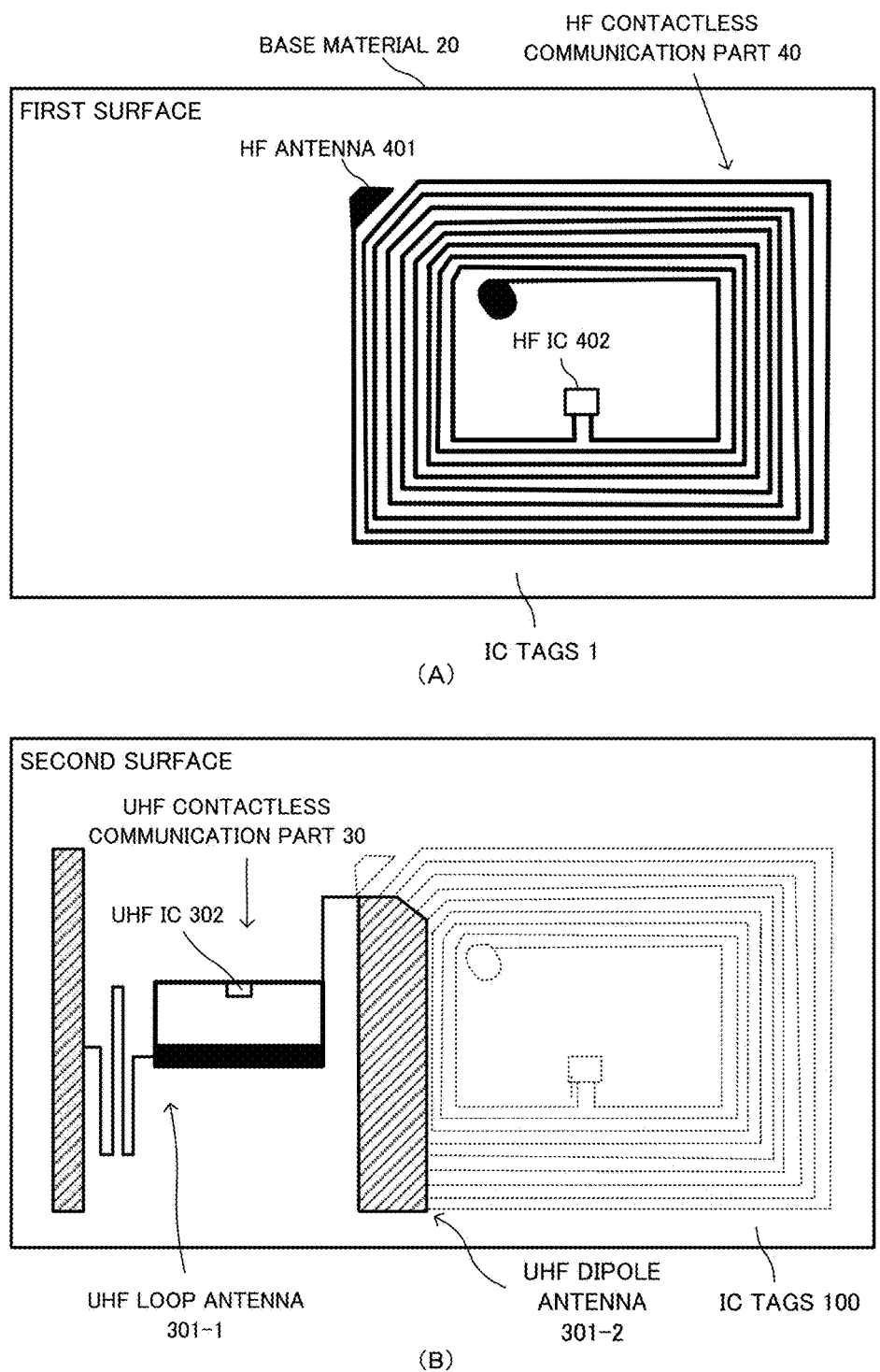
FIG. 16A is a diagram showing the configuration of a first surface of a base material of an IC tag of a third embodiment.
FIG. 16B is a diagram showing the configuration of a second surface of a base material of an IC tag of a third embodiment.

Next, the third embodiment of the contactless information communication terminal device according to the present invention will be described with reference to FIGS. 16A and 16B. It should be noted that FIGS. 16A and 16B contain diagrams showing the configurations of the first surface and the second surface of the IC tag in the present embodiment. In FIGS. 16A and 16B, components similar to those of FIGS. 1A and 1B are provided with the same reference numbers.

In IC tag 100 of the present embodiment, as shown in FIG. 16A, HF antenna 401 and HF IC 402 are formed and located on the first surface of base material 20 and, as shown in FIG. 16B, UHF loop antenna 301-1, UHF dipole antenna 301-2 and UHF IC 302 are formed and located on the second surface of base material 20.

When performing transmission and reception of signals, UHF loop antenna 301-1 and UHF dipole antenna 301-2, and HF antenna 401 have a configuration by means of which electric-field coupling is established with one another via base material 20.

Further, as with the first embodiment, UHF dipole antenna 301-2 includes first element 301-2a and second element 301-2b.

Based on this configuration, even when two or more contactless information communication terminal devices (i.e. UHF contactless communication part 30 and HF contactless communication part 40), which respectively utilize different frequency bands (i.e. the UHF band and the HF band), are mounted, IC tag 100 of the present embodiment is favorably capable of achieving: improvement in the gain of UHF loop antenna 301-1; avoidance of an increase in the size of the IC tag; and communication in the different frequency bands.

[4] Fourth Embodiment

Next, the fourth embodiment of the contactless information communication terminal device according to the present invention will be described with reference to FIGS. 17A, 17B, 18A and 18B. It should be noted that FIGS. 17A and 17B contains diagrams showing the configurations of the first surface and the second surface of the IC tag in the present embodiment. FIGS. 18A and 18B contains diagrams showing other examples of the configuration of the first surface and the second surface of the IC tag in the present embodiment.

Instead of each of UHF contactless communication part 30 or HF contactless communication part 40 being provided in a separate IC that has a processing circuit, such as a transmission/reception part, a processor or the like, as in the first embodiment, the present embodiment is characterized in that a UHF processing circuit and a processing circuit for the HF communication system are formed by an IC which is a single circuit unit (hereinafter referred to as a "hybrid IC".)

However, the configuration of the present embodiment is the same as that of the first embodiment except for the above-described point, and thus, the same members are denoted with the same reference numbers and the descriptions thereof will be omitted. In addition, except for the IC, each antenna is located at a position similar to that in the first embodiment.

As shown in FIGS. 17A and 17B, IC tag 200 of the present embodiment is provided with: base material 20; and UHF/HF contactless communication part 210 that is formed on base material 20 and that utilizes a UHF communication system and an HF communication system.

As shown in FIGS. 17A and 17B, UHF/HF contactless communication part 210 includes: base material 20; UHF antenna 301 formed on base material 20 and to be used for the UHF communication system; HF antenna 401 formed on base material 20 and to be used for the HF communication system; and hybrid IC 220 that has respective processing circuits to be used for the UHF communication system and the HF communication system and that is formed by a single circuit unit.

As with the first embodiment, hybrid IC 220 includes transmission/reception part 3001, electromotive force generation part 3002, processor 3003 and memory 3004 for the UHF communication system and transmission/reception part 4001, electromotive force generation part 4002, processor 4003 and memory 4004 for the HF communication system.

In particular, hybrid IC 220 is connected to UHF antenna 301 and HF antenna 401, and UHF antenna 301 and HF antenna 401 are spaced with a space therebetween due to internal resistance.

Further, on the condition that impedance is matched, as long as hybrid IC 220 is mounted at a position on base material 20 where hybrid IC 220 is in contact with both UHF loop antenna 301-1 of UHF antenna 301 and HF antenna 401, such mounting position is not limited.

However, for hybrid IC 220, since the acceptable range of the position when determining the mounting position based on the impedance matching with UHF antenna 301 is smaller than the acceptable range of the position when determining the mounting position based on the impedance matching with HF antenna 401, hybrid IC 220 is preferably located at an appropriate mounting position in UHF loop antenna 301-1, such as the center of the upper part of UHF loop antenna 301-1, and is connected to HF antenna 401 at such position, as with UHF IC 302 of the first embodiment.

Based on this configuration, IC tag 200 of the present embodiment can configure two or more contactless information communication terminal devices (i.e. UHF contactless communication part 30 and HF contactless communication part 40), which respectively utilize different frequency bands (i.e. the UHF band and the HF band), using hybrid IC 220, which is a single circuit unit.

Accordingly, IC tag 200 of the present embodiment is capable of improving the gain of UHF loop antenna 301-1, of avoiding an increase in the size of the IC tag, of simplifying the production process, since the number of ICs is reduced, and of being produced with ease.

It should be noted that, in the present embodiment, as shown in FIGS. 18A and 18B, the way in which HF antenna 401 is wound may be changed. Although not shown, the positions and directions for locating the loops of UHF loop antenna 301-1 are not limited.

[5] Variation Examples

[5.1] Variation Example 1

Figure 19:
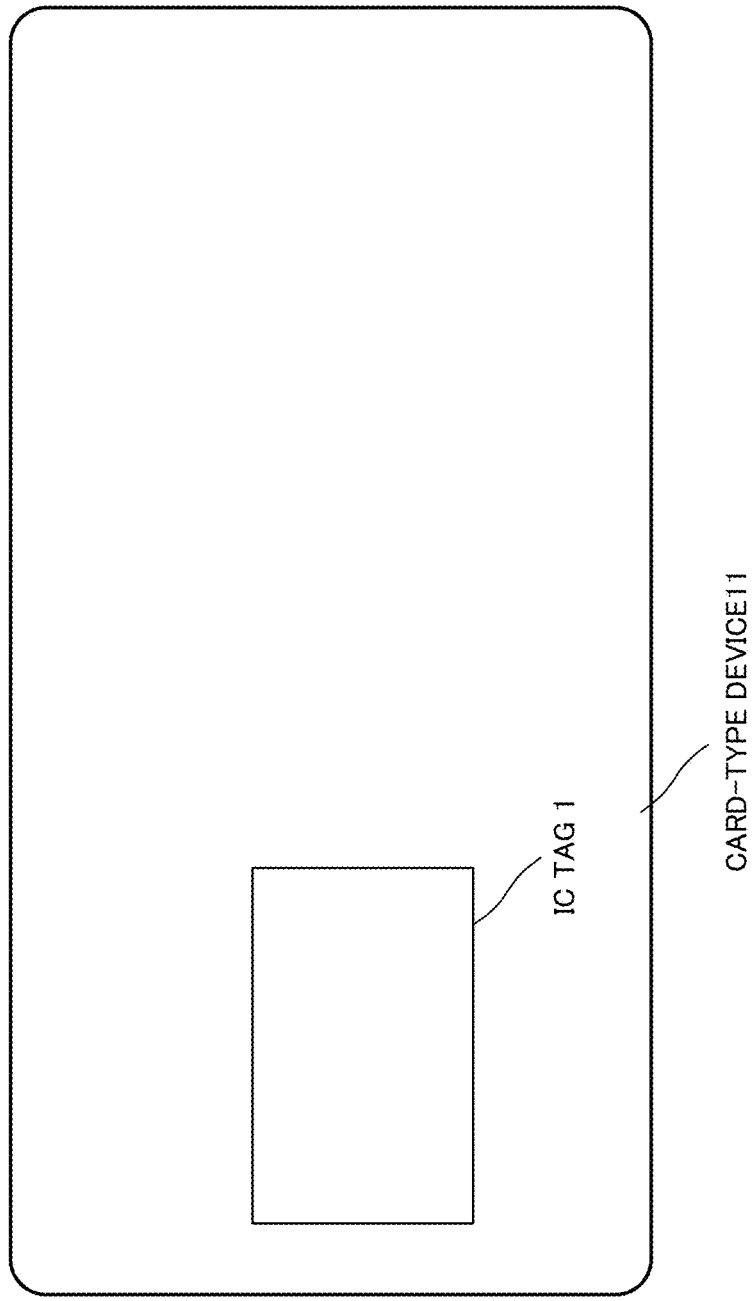
FIG. 19 is a diagram showing the configuration of a card-type device (variation example 1) according to the present invention.

The above-noted embodiments are described using IC tag 1 as an example; however, as shown in FIG. 19, IC tag 1 may be mounted on a card-type housing and utilized as card-type device 11. FIG. 19 is a diagram showing the configuration of card-type device 11 of variation example 1.

When this configuration is employed, card-type device 11 may be utilized as an employee ID card by recording information regarding users, such as their employee number, or the like, in memory 3004 of HF IC 402, and may be utilized in clocking in and out management or room entrance management at office buildings. Further, information regarding electronic money may be recorded in memory 3004, and card-type device 11 may be utilized as a pre-paid ticket for public transportation facilities.

It should be noted that, as for an IC tag, not only the IC tag of the first embodiment but also the IC tag of the second or third embodiment may be used. The electronic money reduction processing, or the like, in this case is similar to that of the conventional HF system and thus, the details thereof will be omitted.

[5.2] Variation Example 2

Figure 20:
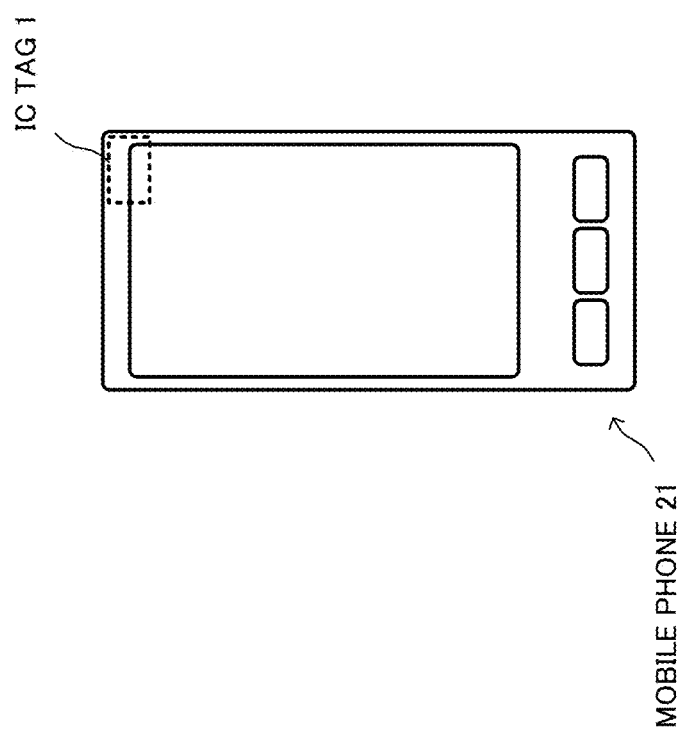
FIG. 20 is a diagram showing the configuration of a mobile phone (variation example 2) according to the present invention.

The above-noted embodiments are described using the IC tag as an example; however, as shown in FIG. 20, IC tag 1 may be mounted in a housing of mobile phone 21 and may also be utilized in the NFC function of mobile phone 21. FIG. 20 is a diagram showing the configuration of mobile phone 21 of variation example 2.

As for an IC tag, not only the IC tag of the first embodiment but also the IC tag of the second or third embodiment may be used. The NFC function in this case is similar to the conventional function and thus, the details thereof will be omitted.

[5.3] Variation Example 3

Figure 21:
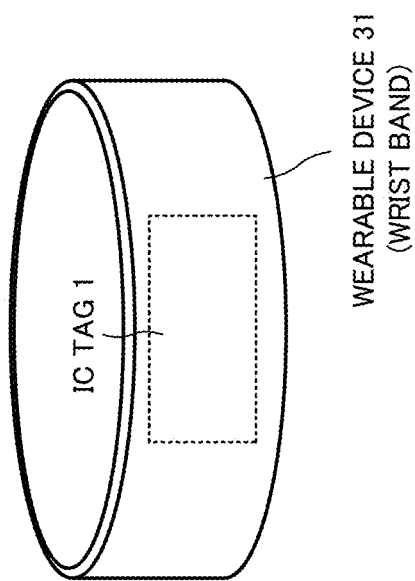
FIG. 21 is a diagram showing the configuration of a wearable device (variation example 3) according to the present invention.

The above-noted embodiments are described using the IC tag as an example; however, as shown in FIG. 21, IC tag 1 may be mounted onto a wrist band, a necklace strap, a pair of glasses, or the like, in order to configure wearable device 31. FIG. 21 is a diagram showing the configuration of wearable device (wrist band) 31 of variation example 3.

In this case, for example, information, etc. regarding an entrance ticket, concert ticket, or ski lift ticket may be recorded in memory 3004 and, at an entrance gate, etc., a reader device is used to read the information and thus, wearable device 31 can be utilized to prevent users without usage qualifications from entering.

[5.4] Variation Example 4

The present embodiments are described using IC tag 1, in which contactless information communication parts for the UHF system and the HF system are provided, and in which the signal transmission and reception are carried out with antennae of the respective systems establishing electric-field coupling with each other; however, an IC tag can also be utilized, in which contactless information communication parts for the UHF system and a low frequency (LF) (for example, 125 KHz) communication system (communication mode: magnetic field resonance), or for another UHF system having a different frequency than the UHF system, may be provided, and in which the signal transmission and reception are carried out with antennae of the respective systems establishing electric-field coupling with each other.

It should be noted that, for contactless information communication in the above-described another UHF system having a different frequency than the UHF system, two antennae are made to have the same length and are arranged in parallel with a spacing of 20 mm or larger therebetween, and the antenna gain of each antenna can be improved by having each antenna make the other antenna function as a reflector.

On the other hand, in the present embodiments, an IC tag is described in which two contactless information communication parts that use two different frequency bands are provided and in which signal transmission and reception are carried out with two antennae establishing electric-field coupling with each other. However, an IC tag in which three or more contactless communication parts that use three or more different frequency bands are provided and in which signal transmission and reception are carried out with three antennae establishing electric-field coupling with one another, is also applicable.

For example, the present invention is also applicable to an IC tag in which contactless information communication parts for three different communication systems, such as an HF system, a UHF system, an LF system and the like, are provided, or in which three contactless information communication parts composed of two UHF systems with different frequencies and an HF system are provided, and in which signal transmission and reception are carried out with three antennae establishing electric-field coupling with one another.

DESCRIPTIONS OF REFERENCE NUMERALS

1, 10, 100, 200 IC tag
11 Card-type device
20 Base material
21 Mobile phone
30 UHF contactless communication part
31 Wearable device
40 HF contactless communication part
21 UHF/HF contactless communication part
220 Hybrid IC
301-1 UHF loop antenna
301-2 UHF dipole antenna
301-2*a* First element
301-2*b* First element
302 UHF IC
401 HF antenna
402 HF IC
3001, 4001 Transmission/reception part
3002, 4002 Electromotive force generation part
3003, 4003 Processor
3004, 4004 Memory

The invention claimed is:

1. A contactless information communication terminal device that performs transmission and reception of a signal in a contactless manner with a plurality of communication devices that use different frequencies when performing transmission, comprising:
   a base material;
   a first antenna that is formed on the base material and that transmits and receives a first signal having a first frequency;
   a first processing circuit that is connected to the first antenna and that, when the first signal is received by the first antenna, performs a predetermined first process based on the first signal and that outputs a signal corresponding to the processed results, as a first processed signal, to the first antenna;
   a second antenna that is formed on the base material and that transmits and receives a second signal having a second frequency, which is different from the first frequency; and a second processing circuit that is connected to the second antenna and that, when the second signal is received by the second antenna, performs a predetermined second process based on the second signal and that outputs a signal corresponding to the processed results, as a second processed signal, to the second antenna, wherein the first antenna and the second antenna are isolated from each other and establish electric-field coupling with each other, a part of the first antenna and the second antenna are separated with a space therebetween and formed on a first surface of the base material, another part of the first antenna is formed on a second surface different from the first surface, and the another part of the first antenna and the second antenna establish electric-field coupling via the base material.

2. The contactless information communication terminal device according to claim 1, wherein the first antenna includes antenna A and antenna B that is a different type than antenna A.

3. The contactless information communication terminal device according to claim 1, wherein the first processing circuit and the second processing circuit respectively generate an electromotive force based on a signal received by the first antenna or the second antenna and perform an appropriate process based on the electromotive force.

4. The contactless information communication terminal device according to claim 3, wherein the base material is formed by a flexible sheet.

5. The contactless information communication terminal device according to claim 1, wherein the another part of the first antenna is a dipole antenna having a first element and a second element, and the second element of the dipole antenna and the second antenna are overlapped via the base material.

6. The contactless information communication terminal device according to claim 5, wherein the second element of the dipole antenna overlaps with part of the second antenna via the base material.

7. The contactless information communication terminal device according to claim 1, wherein a total characteristic impedance under the circumstances where the first antenna and the second antenna are electric-field-coupled matches an input impedance at the first processing circuit or the second processing circuit.

8. The contactless information communication terminal device according to claim 1, wherein at least one of the first processing circuit or the second processing circuit has:

a memory that has identification information for identifying the contactless information communication terminal device from other contactless information communication terminal devices; and a controller that, when the signal is received by the first antenna or the second antenna, reads out the identification information from the memory and that outputs a signal of the identification information from the antenna connected to the at least one of the first processing circuit or the second processing circuit.

9. The contactless information communication terminal device according to claim 8, wherein the identification information includes, at least, information regarding an article or a unit in which the contactless information communication terminal device is mounted.

10. The contactless information communication terminal device according to claim 8, wherein the identification information includes, at least, information regarding a user who uses a device in which the contactless information communication terminal device is mounted.

11. The contactless information communication terminal device according to claim 10, wherein the information regarding the user includes money information to be used when the user makes payments.

12. The contactless information communication terminal device according to claim 1, wherein a single circuit unit has the first processing circuit and the second processing circuit.

13. The contactless information communication terminal device according to claim 12, wherein the first frequency is higher than the second frequency, and the circuit unit is located more proximate to the first antenna than the second antenna unit.

14. A card-type device comprising a contactless information communication terminal device according to claim 1.

15. A mobile phone comprising a contactless information communication terminal device according to claim 1.

16. A wearable device comprising a contactless information communication terminal device according to claim 1.

* * * * *